(12) United States Patent
Chen

(10) Patent No.: US 9,655,099 B2
(45) Date of Patent: May 16, 2017

(54) METHOD AND APPARATUS FOR COORDINATING ONE OR MORE DOWNLINK TRANSMISSIONS IN A WIRELESS COMMUNICATION SYSTEM

(71) Applicant: CELLOS SOFTWARE LTD, Melbourne (AU)

(72) Inventor: Xiaoqin Chen, Mitcham (AU)

(73) Assignee: CellOS Software LTD, Melbourne (AU)

(*) Notice: Subject to any disclaimer, the term of this patent is extended or adjusted under 35 U.S.C. 154(b) by 0 days.

(21) Appl. No.: 15/191,995

(22) Filed: Jun. 24, 2016

(65) Prior Publication Data

US 2016/0309452 A1 Oct. 20, 2016

Related U.S. Application Data

(63) Continuation of application No. 14/500,051, filed on Sep. 29, 2014, now Pat. No. 9,419,757.
(Continued)

(51) Int. Cl.
| | |
|---|---|
| *H04W 4/00* | (2009.01) |
| *H04B 7/216* | (2006.01) |
| *H04W 72/04* | (2009.01) |
| *H04L 5/00* | (2006.01) |
| *H04B 7/024* | (2017.01) |
| *H04B 7/06* | (2006.01) |
| *H04W 72/12* | (2009.01) |
| *H04W 76/00* | (2009.01) |
| *H04W 88/08* | (2009.01) |
| *H04W 28/18* | (2009.01) |

(52) U.S. Cl.
CPC .......... *H04W 72/042* (2013.01); *H04B 7/024* (2013.01); *H04B 7/0632* (2013.01); *H04L 5/0035* (2013.01); *H04L 5/0057* (2013.01); *H04W 72/12* (2013.01); *H04W 76/00* (2013.01); *H04W 88/08* (2013.01); *H04W 28/18* (2013.01); *H04W 72/04* (2013.01)

(58) Field of Classification Search
CPC ............. H04W 24/02; H04W 36/0061; H04W 36/0083
See application file for complete search history.

(56) References Cited

U.S. PATENT DOCUMENTS

| | | |
|---|---|---|
| 2011/0294527 A1 | 12/2011 | Brueck et al. |
| 2013/0273923 A1 | 10/2013 | Li et al. |
(Continued)

*Primary Examiner* — Melanie Jagannathan
(74) *Attorney, Agent, or Firm* — Duane Morris LLP

(57) ABSTRACT

This invention provides a method and apparatus for coordinating downlink transmission(s) in a wireless communication system comprising a cluster of base station clients in communication with a base station cluster coordinator. The method comprises: receiving from each of the cluster of base station clients, a UE parameter set for each UE served by the respective base station clients; determining cluster parameter sets in respect of respective transmission modes, based on the UE parameter sets; evaluating the cluster parameter sets at the base station cluster coordinator, in order to select at least one of the transmission modes for the base station clients; generating at the base station cluster coordinator at least one output according to the at least one transmission mode; and transmitting each output to at least one of the base station clients to control the corresponding base station client to perform the selected downlink transmissions.

13 Claims, 23 Drawing Sheets

Related U.S. Application Data

(60) Provisional application No. 61/886,789, filed on Oct. 4, 2013.

(56) References Cited

U.S. PATENT DOCUMENTS

| | | |
|---|---|---|
| 2013/0301564 A1 | 11/2013 | Chen et al. |
| 2014/0045510 A1 | 2/2014 | Yue et al. |
| 2015/0208263 A1 | 7/2015 | Behravan et al. |

| $m_{1,1}$ | $m_{1,2}$ | $m_{1,3}$ | $m_{2,1}$ | $m_{2,2}$ | $m_{2,3}$ | $m_{3,1}$ | $m_{3,2}$ | $m_{3,3}$ |
|---|---|---|---|---|---|---|---|---|
| --> | --> | --> | --> | --> | --> | --> | --> | --> |
| UE1 | UE4 | UE7 | UE2 | UE5 | UE8 | UE3 | UE6 | UE9 |

Figure 13

METHOD AND APPARATUS FOR COORDINATING ONE OR MORE DOWNLINK TRANSMISSIONS IN A WIRELESS COMMUNICATION SYSTEM

RELATED APPLICATIONS

This application is a continuation of U.S. application Ser. No. 14/500,051, entitled "Method and Apparatus for Coordinating One or More Downlink Transmissions in a Wireless Communication System", filed 29 Sep. 2014, which claims the priority date of U.S. Provisional Patent Application No. 61/886,789, entitled "Communication Apparatus and Method of Resource Allocation in Wireless Communication Network", filed on 4 Oct. 2013, the disclosures of each are hereby incorporated herein by reference.

FIELD OF THE INVENTION

This invention is generally (but not exclusively) related to a method for coordinating one or more downlink transmissions, an apparatus for coordinating one or more downlink transmissions, and a wireless communication system.

BACKGROUND

Coordinated Multi-Point (CoMP) refers to a range of techniques for coordinating transmissions. These techniques may involve allocating resources such as resource blocks (RBs), and scheduling packets for transmission. It is known that CoMP is considered for future deployment of Third Generation Project Partnership (3GPP) Long Term Evolution (LTE) or LTE-Advanced systems.

SUMMARY OF THE INVENTION

This invention provides a method for coordinating one or more downlink transmissions in a wireless communication system comprising a cluster of base station clients in communication with a base station cluster coordinator, the method comprising:
  receiving at the base station cluster coordinator from each one of the cluster of base station clients, a User Equipment (UE) parameter set for each UE served by the respective one of the cluster of base station clients;
  determining a plurality of cluster parameter sets in respect of respective ones of a plurality of transmission modes at the base station cluster coordinator, based on the UE parameter sets;
  evaluating the cluster parameter sets at the base station cluster coordinator, in order to select at least one of the transmission modes for the cluster of base station clients;
  generating at the base station cluster coordinator at least one output according to the at least one transmission mode; and
  transmitting each output to at least one of the base station clients to control the at least one base station client to perform the one or more downlink transmissions.

In an embodiment, each UE parameter set comprises (i) a Channel Quality Indicator (CQI) indicating a channel quality between a UE and a base station client serving the UE and (ii) a set of Reference Signal Receipt Powers (RSRPs), each RSRP indicating a receipt power of a reference signal sent to the UE from a respective one of the base station clients.

In an embodiment, each cluster parameter set comprises a cluster CQI, and determining the cluster parameter sets comprises determining, for each one of the transmission modes, a cluster CQI based on the CQIs and the sets of RSRPs.

In an embodiment, determining a cluster CQI comprises:
  calculating a plurality of estimated cluster CQIs based on the CQIs and the sets of RSRPs received at the base station cluster coordinator; and
  comparing the estimated cluster CQIs, in order to determine the largest one of the estimated cluster CQIs as the cluster CQI.

In an embodiment, one of the transmission modes is a transmission mode where only one of the cluster of base station clients performs a downlink transmission.

In an embodiment, at least one of the transmission modes is a Coordinated Multi-Point (CoMP) transmission mode where each one of a set of the cluster of base station clients performs a downlink transmission.

In an embodiment, the CoMP transmission mode is a CoMP Coordinated Scheduling (CS) transmission mode where each one of the set of base station clients performs a downlink transmission to a respective one of a plurality of different UEs.

In an embodiment, the CoMP transmission mode is a CoMP Joint Processing (JP) transmission mode where each one of the set of base station clients performs a downlink transmission to the same UE.

In an embodiment, the CoMP transmission mode is a CoMP hybrid transmission mode where each one of a first set of the cluster of base station clients performs a downlink transmission to the same UE, and each one of a second set of the cluster of base station clients performs a downlink transmission to a respective one of a plurality of different UEs.

In an embodiment, evaluating the cluster parameter sets comprises:
  comparing the cluster CQIs, in order to determine the largest one of the cluster CQIs; and
  selecting the transmission mode corresponding to the largest cluster CQI.

In an embodiment, the method further comprises receiving each UE parameter set from a UE at one of the cluster of base station clients.

This invention also provides an apparatus for coordinating one or more downlink transmissions in a wireless communication system comprising a cluster of base station clients, the apparatus being in communication with each one of the cluster of base station clients and comprising:
  a User Equipment (UE) parameter set receiver arranged to receive from each one of the cluster of base station clients, a UE parameter set for each UE served by the respective one of the cluster of base station clients;
  a cluster parameter set determiner arranged to determine a plurality of cluster parameter sets in respect of respective ones of a plurality of transmission modes at the base station cluster coordinator, based on the UE parameter sets;
  a transmission mode selector arranged to evaluate the cluster parameter sets at the base station cluster coordinator, in order to select at least one of the transmission modes for the cluster of base station clients;
  an output generator arranged to generate at least one output according to the at least one transmission mode; and
  an output transmitter arranged to transmit each output to at least one of the base station clients to control the at least one base station client to perform the one or more downlink transmissions.

In an embodiment, each UE parameter set comprises (i) a Channel Quality Indicator (CQI) indicating a channel quality between a UE and a base station client serving the UE and (ii) a set of Reference Signal Receipt Powers (RSRPs), each RSRP indicating a receipt power of a reference signal sent to the UE from a respective one of the base station clients.

In an embodiment, each cluster parameter set comprises a cluster CQI, and wherein the cluster parameter set determiner is a cluster CQI determiner arranged to determine, for each one of the transmission modes, a cluster CQI based on the CQIs and the sets of RSRPs received at the UE parameter set receiver.

In an embodiment, the cluster CQI determiner is arranged to:

calculate a plurality of estimated cluster CQIs based on the CQIs and the sets of RSRPs received at the UE parameter set receiver; and compare the estimated cluster CQIs, in order to determine the largest one of the estimated cluster CQIs as the cluster CQI.

In an embodiment, one of the transmission modes is a transmission mode where only one of the cluster of base station clients performs a downlink transmission.

In an embodiment, at least one of the transmission modes is a Coordinated Multi-Point (CoMP) transmission mode where each one of a set of the cluster of base station clients performs a downlink transmission.

In an embodiment, the CoMP transmission mode is a CoMP Coordinated Scheduling (CS) transmission mode where each one of the set of base station clients performs a downlink transmission to a respective one of a plurality of different UEs.

In an embodiment, the CoMP transmission mode is a CoMP Joint Processing (JP) transmission mode where each one of the set of base station clients performs a downlink transmission to the same UE.

In an embodiment, the CoMP transmission mode is a CoMP hybrid transmission mode where each one of a first set of the cluster of base station clients performs a downlink transmission to the same UE, and each one of a second set of the cluster of base station clients performs a downlink transmission to a respective one of a plurality of different UEs.

In an embodiment, the transmission mode selector is arranged to:

compare the cluster CQIs determined at the cluster CQI determiner, in order to determine the largest one of the cluster CQIs; and select the transmission mode corresponding to the largest cluster CQI.

In an embodiment, each base station client is arranged to receive a UE parameter set from a UE.

This invention also provides a wireless communication system comprising:

a cluster of base station clients, each one of the cluster of base station clients being arranged to receive a User Equipment (UE) parameter set from each UE served by the respective one of the cluster of base station clients; and a base station cluster coordinator for coordinating one or more downlink transmissions in the wireless communication system, the apparatus being in communication with each one of the cluster of base station clients and comprising:

a UE parameter set receiver arranged to receive from each one of the cluster of base station clients, the UE parameter set for each UE served by the respective one of the cluster of base station clients;

a cluster parameter set determiner arranged to determine a plurality of cluster parameter sets in respect of respective ones of a plurality of transmission modes at the base station cluster coordinator, based on the UE parameter sets;

a transmission mode selector arranged to evaluate the cluster parameter sets at the base station cluster coordinator, in order to select at least one of the transmission modes for the cluster of base station clients;

an output generator arranged to generate at least one output according to the at least one transmission mode; and an output transmitter arranged to transmit each output to at least one of the base station clients to control the at least one base station client to perform the one or more downlink transmissions.

BRIEF DESCRIPTION OF THE DRAWINGS

In order that this invention may be more clearly ascertained, embodiments of the invention will be described, by way of example, with reference to the accompanying drawings in which:

FIG. 13 is a schematic diagram of scheduling metrics;

DETAILED DESCRIPTION

Figure 1:
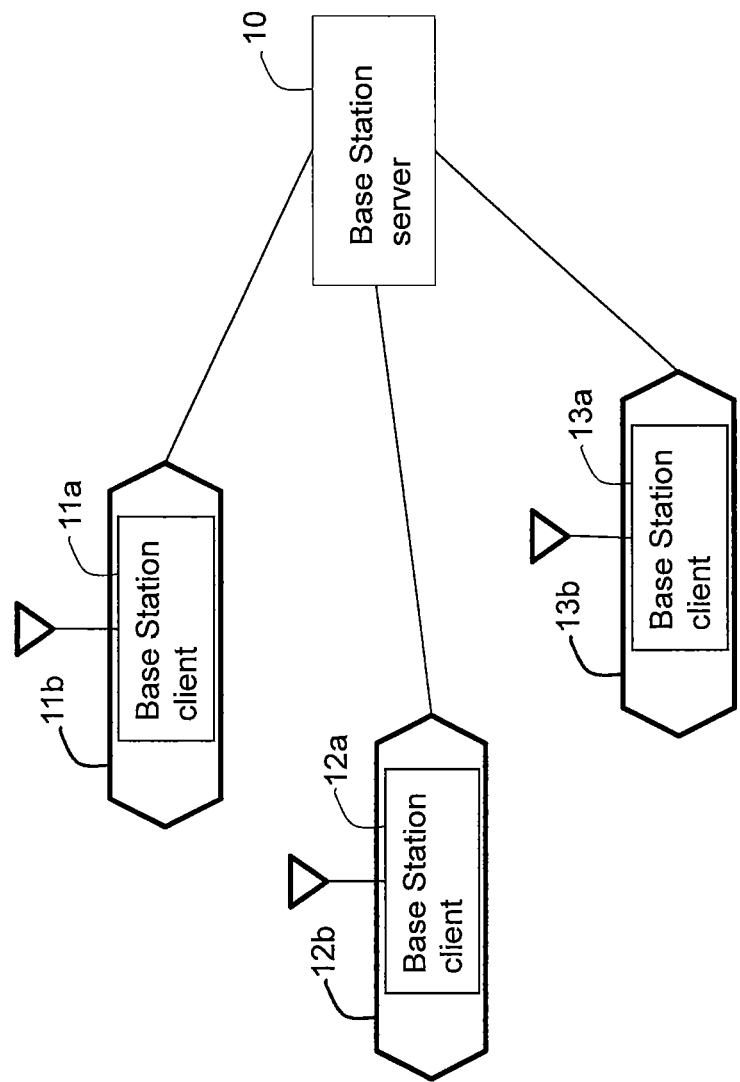
FIG. 1 is a schematic diagram of a wireless communication system comprising a base station server and a plurality of base station clients.

Referring to the accompanying drawings, there is illustrated a base station server 10 comprising a base station cluster coordinator 110 for coordinating one or more downlink transmissions of a cluster of base station clients 11a, 12a, 13a in communication with the base station server 10 in a wireless communication system 1. The base station cluster coordinator 110 is arranged to receive from each base station client 11a, 12a, 13a, a User Equipment (UE) parameter set for each UE served by the base station client 11a, 12a, 13a. Based on the received UE parameter sets, the base station cluster coordinator 110 determines a plurality of cluster parameter sets in respect of respective ones of a plurality of transmission modes (such as a Coordinated Multi-Point (CoMP) Joint Processing (JP) transmission mode where each one of a subset of the cluster of base station clients 11a, 12a, 13a performs a downlink transmission to the same UE, and evaluates the cluster parameter sets in order to select at least one of the transmission modes for the cluster of base station clients 11a, 12a, 13a. The base station cluster coordinator 110 is also arranged to generate at least one output according to the at least one selected transmission mode, and transmit each output to at least one of the cluster of base station clients 11a, 12a, 13a to control the at least one base station client 11a, 12a, 13a to perform the downlink transmissions.

Persons skilled in the art will appreciate that the term "downlink" refers to the flow of data or packets from a base station (which may in a distributed form comprising a base station client 11a, 12a, 13a and a base station server 10) to a UE.

Depending on the embodiment, a base station client 11a, 12a, 13a may be either (i) a conventional base station (such as a conventional evolved Node B) or (ii) a client that performs only part of the baseband processing typically performed by a conventional base station, in particular, one that performs just the radio baseband processing (as indicated below).

Persons skilled in the art will also appreciate that the cluster of base station clients 11a, 12a, 13a may comprise only one base station client 11a, 12a, 13a or multiple base station clients 11a, 12a, 13a depending on the embodiment.

Persons skilled in the art will also appreciate that the wireless communication system 1 may comprise more than one cluster of base station clients 11a, 12a, 13a. That is, it is envisaged that there may be multiple clusters of base station clients 11a, 12a, 13a in the wireless communication system 1.

Persons skilled in the art will also appreciate that the wireless communication system 1 may comprise multiple base station servers 10 and multiple clusters of base station clients 11a, 12a, 13a, and each cluster of base station clients 11a, 12a, 13a may be in communication with respective one of the base station servers 10.

General Construction of the Wireless Communication System

FIG. 1 is a schematic diagram of an embodiment of the wireless communication system 1. The system 1 conforms to the Third Generation Project Partnership (3GPP) Long Term Evolution (LTE) standard, and is based on a Cloud-Random Access Network (C-RAN) arrangement where baseband processing conventionally performed by a conventional evolved Node B is split/distributed between a base station server 10 (also referred to as a base station hotel) and a base station client 11a, 12a, 13a (also referred to as cell site equipment or a Remote Radio Head Unit (RHU)).

The system 1 comprises a base station server 10 and three base station clients 11a, 12a, 13a. Persons skilled in the art will appreciate that the system 1 may include more than one base station server 10 and/or one, two or more than three base station clients 11a, 12a, 13a.

Each base station client 11a, 12a, 13a is located at a respective one of a plurality of cell sites (or antenna towers) 11b, 12b, 13b located remotely from the location of the base station server 10, and is connected to the base station server 10 such that one or more packets (for example, one or more Radio Link Control (RLC) Service Data Units (SDUs) received from a UE) may be transmitted from the base station client 11a, 12a, 13a to another base station client 11a, 12a, 13a via the base station server 10. Each base station client 11a, 12a, 13a is connected to the base station server 10 via an optical fibre link Persons skilled in the art will appreciate that one or more of the base station clients 11a, 12a, 13a may alternatively be connected to the base station server 10 via a different type of link such as a high-speed wireless link.

It is envisaged that the base station server 10 may be connected to other base station servers or conventional base stations such that one or more packets (for example, one or more RLC SDUs received from a base station client 11a, 12a, 13a) may be transmitted from the base station server 10 to another base station server or conventional base station. The base station server 10 may be connected to other base station servers or conventional base stations via a core network (such as an Evolved Packet Core (EPC)), and that the base station server 10 may be connected to the core network via a connection point (such as a General Packet Radio Service (GPRS) Tunnelling Protocol-User plane (GTP-U) Tunnel end point) at the core network. Also, it is envisaged that the system 1 may support multiple bands and be scaled by increasing the number of base station clients 11a, 12a, 13a and the capacity of the base station server 10, for example, by increasing the number of baseband processing units implemented by the base station server 10.

Figure 2:
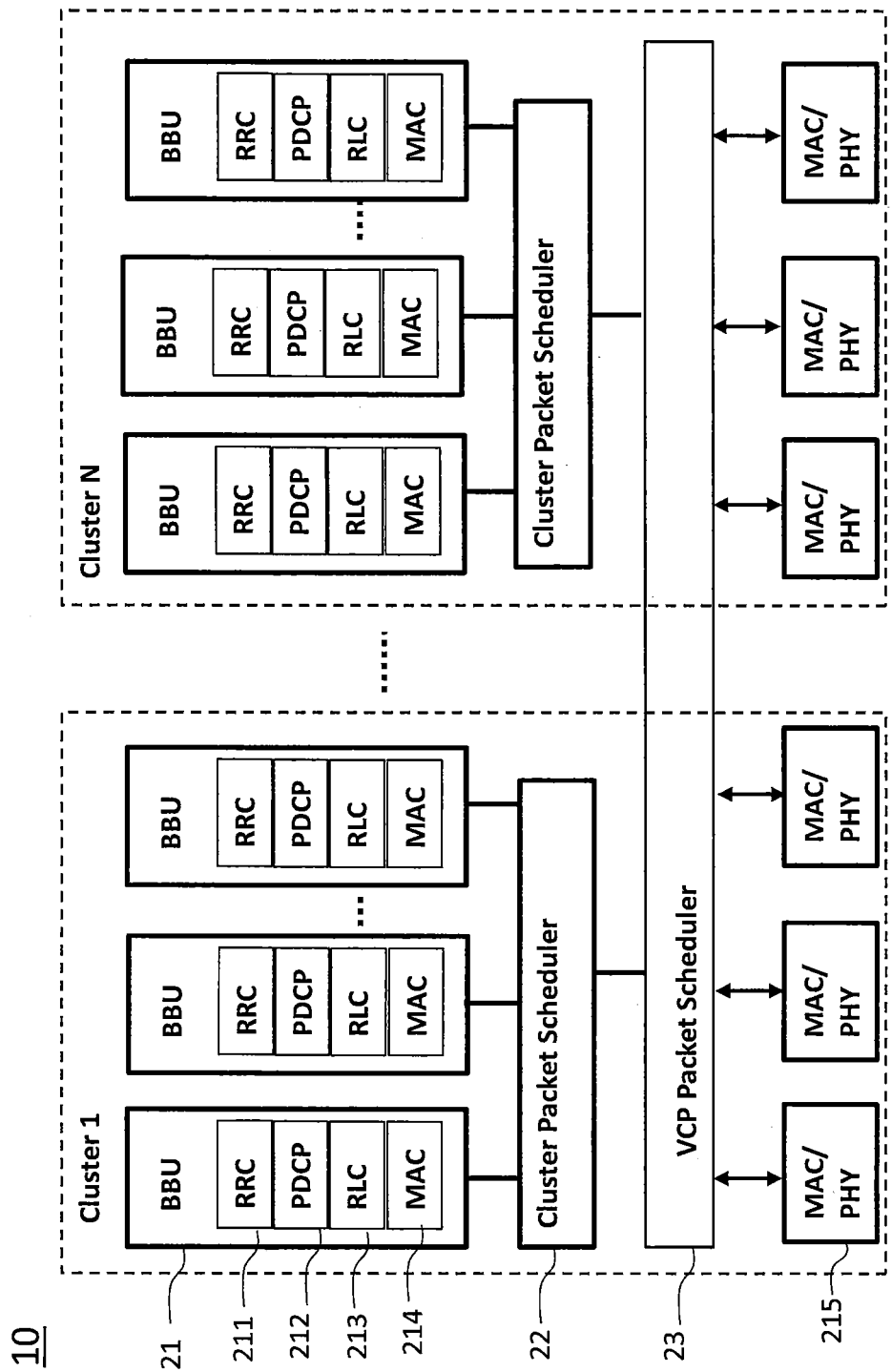
FIG. 2 is a schematic diagram of some of the logical components of the system of FIG. 1.

FIG. 2 is a schematic diagram of the logical components of the system 1. The base station server 10 comprises a plurality of clusters of Baseband processing Units (BBUs) 21. The BBUs 21 of each cluster of BBUs are connected to a respective cluster packet scheduler (or cluster level scheduler) 22. Each cluster packet scheduler 22 can control each of the BBUs 21 connected to the cluster packet scheduler 22 to coordinate downlink transmissions by way of packet scheduling and/or resource allocation. Also, the BBUs 21 of each cluster of BBUs may be jointly coordinated by a corresponding cluster packet scheduler 22.

In this embodiment, the base station server 10 is implemented on a Virtual Cloud Platform (VCP), and each cluster packet scheduler 22 is connected to a VCP packet scheduler 23. All of the BBUs of the system 1 may be jointly coordinated by the VCP packet scheduler 23. Each BBU 21 is connected to a corresponding base station client 11a, 12a, 13a via a corresponding cluster packet scheduler 22, and the VCP packet scheduler 23.

Each BBU 21 comprises a Radio Resource Control (RRC) processing entity 211, a Packet Data Convergence Protocol (PDCP) processing entity 212 and a RLC processing entity 213 and a Medium Access Control (MAC) processing entity 214. Each BBU 21 is associated with a corresponding MAC/Physical (PHY) processing entity 215. It is envisaged that the baseband processing conventionally performed by a conventional base station can be performed by a base station client 11a, 12a, 13a, a corresponding BBU 21, a corresponding cluster packet scheduler 22, a corresponding MAC/PHY processing entity 215 and the VCP packet scheduler 23 of the system 1.

Figure 3:
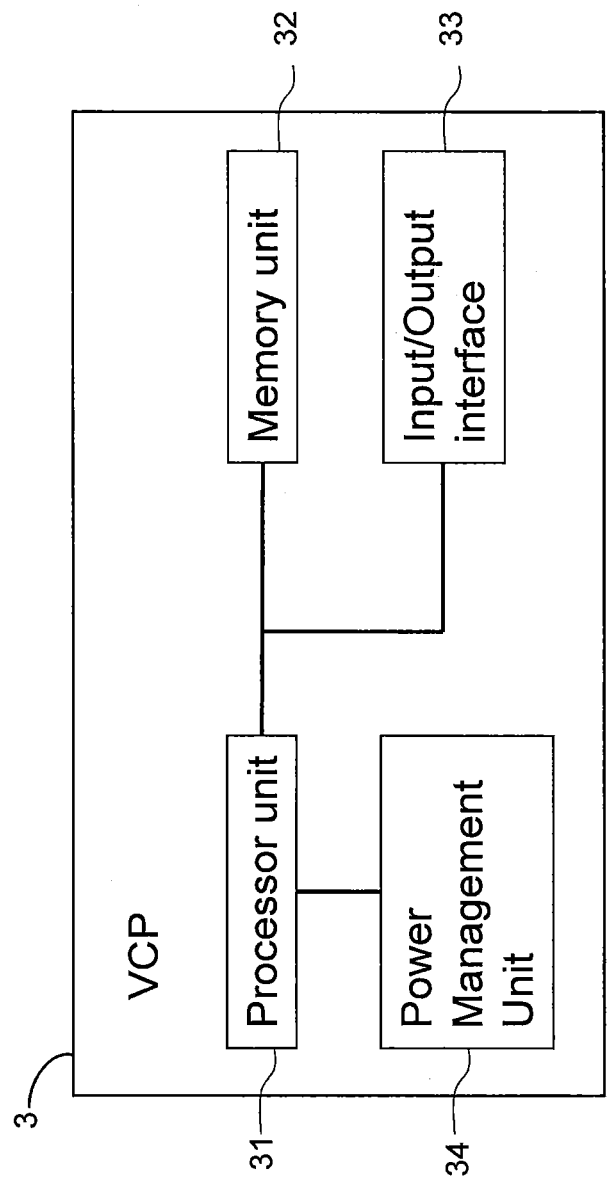
FIG. 3 is a schematic diagram of some of the physical components of the base station server of FIG. 1.

FIG. 3 is a schematic diagram of the physical components of the VCP 3 implementing the base station server 10. The VCP 3 includes a processor unit 31, a memory unit 32, an input/output interface 33 and a power management unit 34. The processor unit 31 is logically or electrically connected to the memory unit 32, the input/output interface 33 and the power management unit 34. It is envisaged that the VCP 3 may be a blade server, and the processor unit 31 may be a multi-core processor. The memory unit 32 may include static memory storage devices and dynamic memory storage devices.

The processor unit 31 is configured to implement (or execute) a number of software modules based on program code and/or data stored in the memory unit 32. For example, the memory unit 32 stores program code for implementing software modules corresponding to the RRC processing entity 211, the PDCP processing entity 212, the RLC processing entity 213, the MAC/PHY processing 214, the cluster packet scheduler 22 and the VCP packet scheduler entity 23. Persons skilled in the art will appreciate that one or more of the software modules could alternatively be implemented in some other way, for example, by one or more dedicated circuits.

The input/output interface 33 is an interface for connecting each BBU 21 to a corresponding base station client 11a, 12a, 13a. The power management unit 34 includes a power supply (not shown) for providing electrical power to the VCP 3 and management logics (not shown) for controlling the supply of power to the VCP 3.

Figure 4:
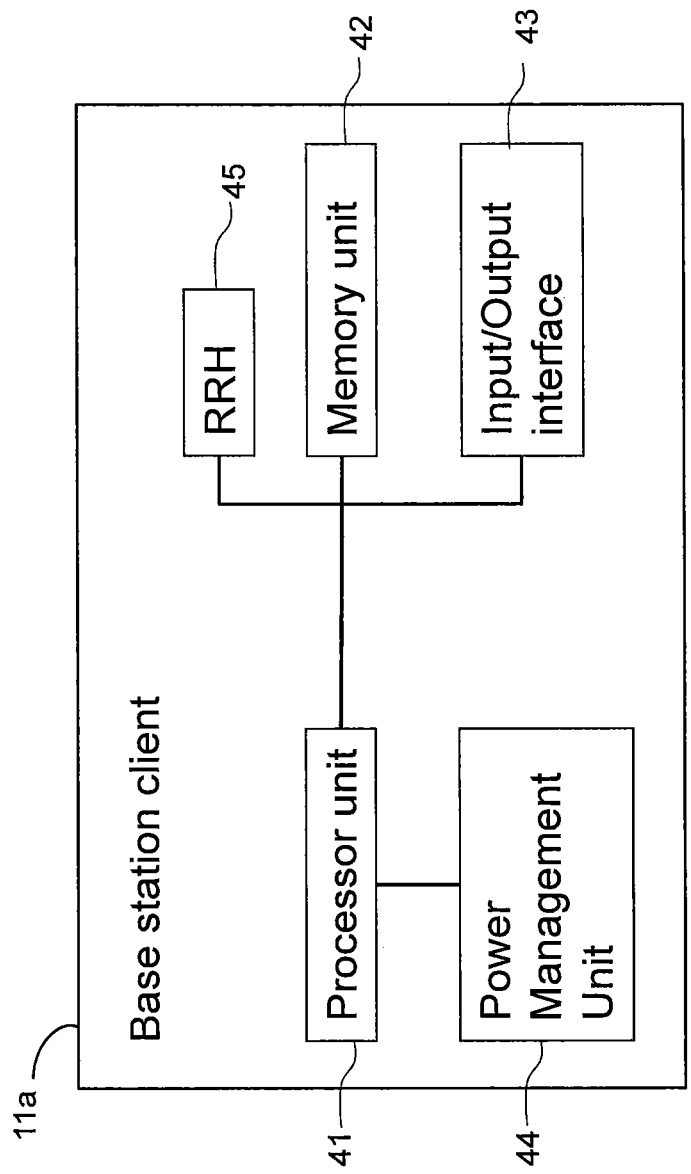
FIG. 4 is a schematic diagram of some of the physical components of one of the base station clients of FIG. 1.

FIG. 4 is a schematic diagram of the physical components of a base station client 11a, 12a, 13a. Each base station client 11a, 12a, 13a includes a processor unit 41, a memory unit 42, an input/output interface 43, a power management unit 44, and a Remote Radio Head (RRH) 45. The RRH 45 comprises Radio Frequency (RF) circuitry for transmitting and/or receiving RF signals conforming to the 3GPP LTE standard. It is envisaged that the RRH 45 may include an antenna (not shown) and RF signal processing components (not shown) such as, but not limited to, a Digital-to-Analogue signal converter (DAC), an Analogue-to-Digital signal converter (ADC), an oscillation signal generator, a modulator, a demodulator, a power amplifier, and a bandpass filter.

The processor unit 41 is logically or electrically connected to the memory unit 42, the input/output interface 43, the power management unit 44, and the RRH 45. It is envisaged that the processor unit 41 may be a multi-core processor. The memory unit 42 may include static memory storage devices and dynamic memory storage devices. The processor unit 41 is configured to implement (or execute) a number of software modules based on program code and/or data stored in the memory unit 42. For example, the memory unit 42 may store program code for implementing software modules corresponding to a MAC/PHY processing entity corresponding to the MAC/PHY processing entity 214 of FIG. 2. Persons skilled in the art will appreciate that one or more of the software modules could alternatively be implemented in some other way, for example, by one or more dedicated circuits.

The input/output interface 43 is an interface for connecting the base station client 11a, 12a, 13a to the base station server 10. The power management unit 44 includes a power supply (not shown) for supplying electrical power to the base station client 11a, 12a, 13a and management logics (not shown) for controlling the electrical power supply to the base station client 11a, 12a, 13a.

Further Details of the Wireless Communication System

Figure 18:
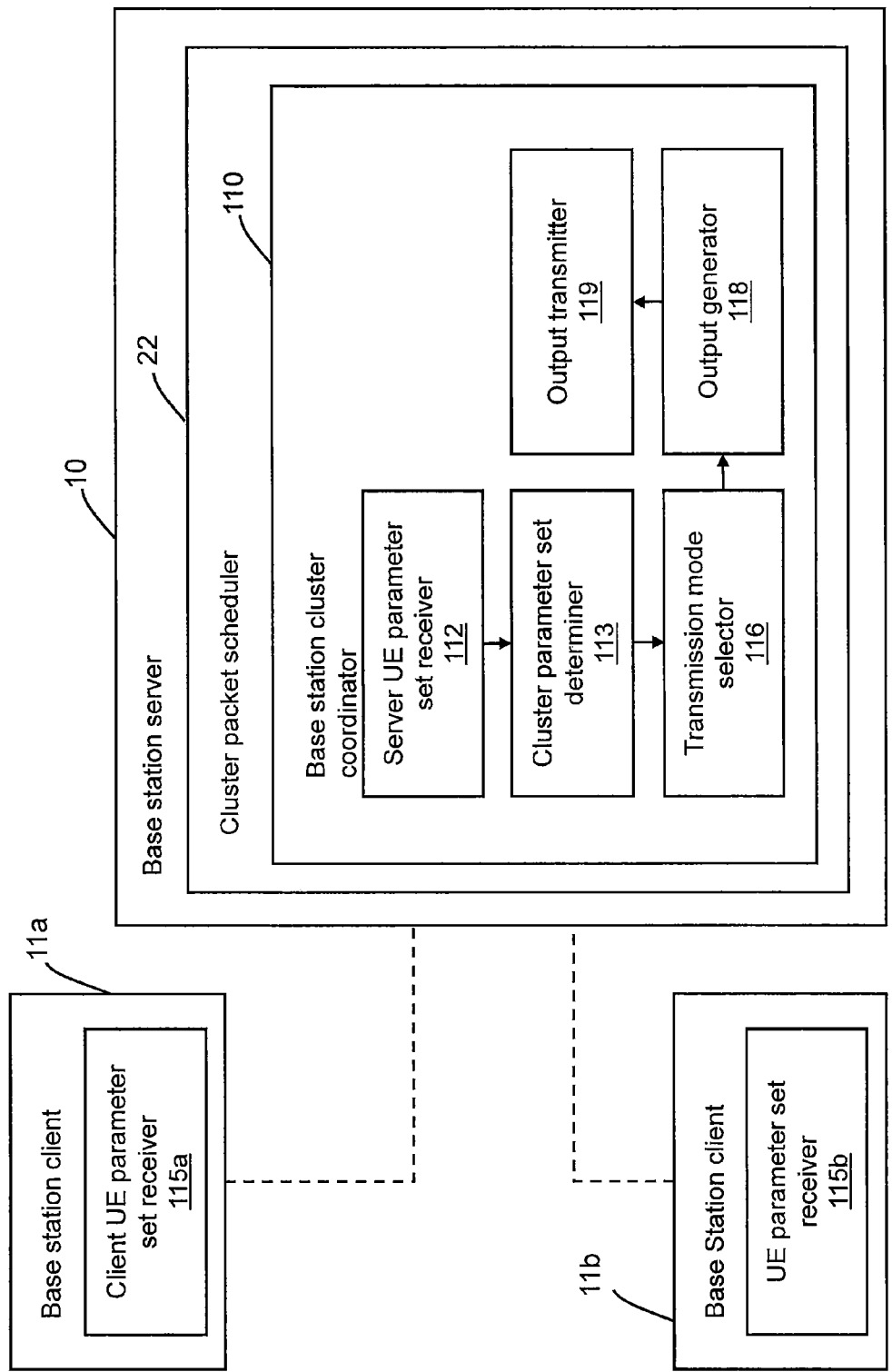
FIG. 18 is a schematic diagram of some of the functional components of the base station server and the base station clients of FIG. 1.

FIG. 18 is a schematic diagram of some of the functional components of an embodiment of the wireless communication system 1 comprising a cluster of base station clients 11a, 12a, 13a in communication with a base station server 10. In this embodiment, the functional components are implemented by software modules. However, a person skilled in the art will appreciate that the functional components could alternatively be implemented in some other way, for example, by one or more dedicated circuits.

In FIG. 18, only part of the wireless communication system 1 is illustrated. More specifically, only two of the base station clients 11a, 12a, 13a and the base station server 10 are illustrated.

As indicated above, baseband processing conventionally performed by a conventional base station is in this embodiment split or distributed between a base station client 11a, 12a, 13a and the base station server 10. In particular, the cluster packet scheduler 22 implemented by the base station server 10 comprises a base station cluster coordinator 110 for coordinating one or more downlink transmissions of the cluster of base station clients 11a, 12a, 13a. The base station cluster coordinator 110 comprises a number of functional components for coordinating the one or more downlink transmissions.

Firstly, the base station cluster coordinator 110 comprises a server UE parameter set receiver 112 arranged to receive from each one of the cluster of base station clients 11a, 12a, 13a, a UE parameter set for each UE served by the respective one of the cluster of base station clients 11a, 12a, 13a. In this embodiment, each UE parameter set received by the server UE parameter set receiver 112 is previously received by a client UE parameter set receiver 115 of a base station client 11a, 12a, 13a. However, it is envisaged that one or more UE parameter sets received by the base station server UE parameter set receiver 112 may not be previously received from a UE in an alternative embodiment. For example, in an alternative embodiment, a UE parameter set may be previously received by a base station client 11a, 12a, 13a from another base station client 11a, 12a, 13a.

In this embodiment, each UE parameter set comprises (i) a Channel Quality Indicator (CQI) indicating a channel quality—specifically, a Signal to Interference plus Noise Ratio (SINR)—between a UE and a base station client 11a, 12a, 13a serving the UE and (ii) a set of Reference Signal Receipt Powers (RSRPs), each one of the RSRPs indicating the receipt power of a reference signal sent to the UE from a respective one of the cluster of base station clients 11a, 12a, 13a. It is noted that the set of RSRPs with respect to a UE may include the receipt power of a signal sent to the UE from the base station client 11a, 12a, 13a serving the UE, and not just the receipt powers of signals sent to the UE from base station client or clients 11a, 12a, 13a other than the base station client 11a, 12a, 13a serving the UE.

It is envisaged that one, more or all of the UE parameter sets received by the server UE parameter set receiver 112 may not comprise a CQI and a set of RSRPs in an alternative embodiment. For example, in an alternative embodiment, each UE parameter set may comprise a CQI and a set of at least one Reference Signal Received Quality (RSRQ).

The base station cluster coordinator 110 also comprises a cluster parameter set determiner 113 arranged to determine a plurality of cluster parameter sets in respect of respective ones of a plurality of transmission modes, based on the UE parameter sets received by the server UE parameter set receiver 112. In this embodiment, each cluster parameter set comprises a cluster CQI, and the cluster parameter set determiner 113 is a cluster CQI determiner 113 that determines, for each one of the transmission modes, a cluster CQI, based on the CQIs and the sets of RSRPs received at the server UE parameter set receiver 112. It is envisaged however that each cluster parameter set may not comprise a cluster CQI in an alternative embodiment. For example, each cluster parameter set may alternatively comprise a sum rate or a downlink throughput that may be converted from a CQI, and the cluster parameter set determiner 113 may alternatively be a cluster sum rate or downlink throughput determiner that determines, for each one of the transmission modes, a cluster sum rate or downlink throughout.

In this embodiment, the plurality of transmission modes include:

(1) A transmission mode where only one of the cluster of base station clients 11a, 12a, 13a performs a downlink transmission.

(2) A Coordinated Multi-Point (CoMP) Coordinated Scheduling (CS) transmission mode where each one of a subset of the cluster of base station clients 11a, 12a, 13a performs a downlink transmission to a respective one of a plurality of different UEs.

(3) A CoMP Joint Processing (JP) transmission mode where each one of a subset of base station clients 11a, 12a, 13a performs a downlink transmission to the same UE.

(4) A CoMP hybrid transmission mode where each one of a first subset of the cluster of base station clients 11a, 12a, 13a performs a downlink transmission to the same UE, and each one of a second subset of the cluster of base station clients 11a, 12a, 13a performs a downlink transmission to a respective one of a plurality of different UEs.

It is envisaged that there may be additional or alternative transmission modes in an alternative embodiment. Also, it is envisaged that one or more of the above transmission modes may not be included in an alternative embodiment. For example, it is envisaged that in an alternative embodiment, there may not be a CoMP hybrid transmission mode, and the cluster parameter set determiner 113 may not determine a cluster parameter set in respect of a CoMP hybrid transmission mode.

In use, the cluster CQI determiner 113 determines a cluster CQI for each transmission mode, by firstly calculating, for the transmission mode, a plurality of estimated cluster CQIs based on the CQIs and the sets of RSRPs received at the UE parameter set receiver 112. Then, the cluster CQI determiner 113 compares the estimated cluster CQIs, in order to determine the largest one of the estimated cluster CQIs as the cluster CQI for the transmission mode.

More specifically, the cluster parameter set determiner 113 first calculates, for each UE served by the base station clients 11a, 12a, 13a, the power P(base station client,UE) of a signal received at the UE from the base station client 11a, 12a, 13a serving the UE using the equation below:

$$CQI(\text{base station client,UE}) = P(\text{base station client,UE})/(\text{sum}(RSRP(\text{base station client,UE}) + \text{alpha}) + N).$$

In this example, each CQI is expressed as a SINR value seen at a UE, P(base station client,UE) refers to an estimated power of a reference signal (that is, one that is sent from the base station serving the UE) measured at the UE, N is a Gaussian random number representing white noise, and (sum(RSRP(base station client,UE)+alpha) is an approximation of the total interference from the base station clients 11a, 12a, 13a seen at the UE where alpha is a Gaussian random number. In this respect, it is noted that the total interference depends on a transmission mode previously selected by the cluster packet scheduler 22. Thus, when P(base station client 1,UE) is the power of reference signal transmitted from base station client 1, (sum(RSRP(base station client,UE)+alpha) may refer to the total interference from base station client 2, from base station client 3, or from both base station client 2 and base station client 3 depending on the transmission mode previously selected by the cluster packet scheduler 22.

After calculating, for each UE, the power P(base station clienti,UEj) of a signal received at the UE, the cluster CQI determiner 113 calculates the plurality of estimated cluster CQIs for the above mentioned transmission mode where only one of the cluster of base station clients 11a, 12a, 13a performs a downlink transmission (that is, above mentioned transmission mode (1)). More specifically, the cluster CQI determiner 113 calculates each estimated cluster CQI (Estimated CQI(base station client,UE)) using the equation below:

$$\text{Estimated CQI(base station client,UE)} = P(\text{base station client,UE})/N$$

That is, each estimated CQI is calculated by dividing the power of a signal received at a UE with the background noise.

For example, in a scenario where there are 3 base station clients and each base station client is serving 2 UEs, an estimated CQI(base station client,UE) in respect of transmission mode (1) where only one (base station client 1) out of the 3 base station clients is transmitting to one UE (UE1) (that is, the estimated cluster CQI of a UE (UE1) served by a base station client (base station client 1)) is:

$$\text{Estimated CQI(base station client 1,UE1)} = P(\text{base station client 1,UE1})/N$$

Then, the cluster CQI determiner 113 compares for transmission mode (1) the plurality of estimated cluster CQIs, in order to determine the largest one of the estimated cluster CQIs as the cluster CQI in respect of the transmission mode.

For example, in a scenario where there are 3 base station clients and each base station client is serving 2 UEs, the cluster CQI in respect of transmission mode (1) is:

$$\text{Cluster CQI} = \max(\text{Estimated CQI(base station client 1,UE1), Estimated CQI(base station client 1,UE2), Estimated CQI(base station client 2,UE3), Estimated CQI(base station client 2,UE4)} \ldots)$$

where Estimated CQI(base station client 1,UE1) represents the estimated cluster CQI of a UE (UE1) served by a base station client (base station client 1).

After determining the cluster CQI for transmission mode (1), the cluster CQI determiner 113 calculates a plurality of estimated cluster CQIs in respect of the above mentioned CoMP CS transmission mode where each one of a subset of the cluster of base station clients 11a, 12a, 13a performs a downlink transmission to a respective one of a plurality of different UEs (that is, above mentioned transmission mode (2)). Then, the cluster CQI determiner 113 compares the plurality of estimated cluster CQIs in respect of transmission mode (2), in order to determine the largest one of the estimated cluster CQIs as the cluster CQI in respect of the transmission mode (2).

After determining the cluster CQI for transmission mode (2), the cluster CQI determiner 113 calculates a plurality of estimated cluster CQIs in respect of a CoMP JP transmission mode where each one of a subset of base station clients 11a, 12a, 13a performs a downlink transmission to the same UE (that is, above mentioned transmission mode (3)). Then, the cluster CQI determiner 113 compares the plurality of estimated cluster CQIs in respect of transmission mode (3), in order to determine the largest one of the estimated cluster CQIs as the cluster CQI in respect of the transmission mode (3).

After determining the cluster CQI for transmission mode (3), the cluster CQI determiner 113 calculates a plurality of estimated cluster CQIs in respect of a CoMP hybrid transmission mode where each one of a first subset of the cluster of base station clients 11a, 12a, 13a performs a downlink transmission to the same UE, and each one of a second subset of the cluster of base station clients 11a, 12a, 13a performs a downlink transmission to a respective one of a plurality of different UEs (that is, above mentioned transmission mode (4)). Then, the cluster CQI determiner 113 compares the plurality of estimated cluster CQIs in respect of transmission mode (4), in order to determine the largest one of the estimated cluster CQIs as the cluster CQI in respect of the transmission mode (4).

In this embodiment, the cluster CQI determiner 113 calculates each of the above mentioned estimated cluster CQI using the equation below:

Estimated CQI(base station client,UE)=sum(P(base station client,UE)/(I+N))

where I represents the interference from a signal transmitted from another base station client to another UE.

For example, in a scenario where there are 3 base station clients and each base station client is serving 2 UEs, an estimated CQI(base station client,UE) in respect of transmission mode (2) where 2 of the 3 base station clients are simultaneously transmitting in the same RB and each transmitting base station client is transmitting to a different UE is:

Estimated CQI(1)=max(Estimated CQI(1,1),Estimated CQI(1,2) . . . )

where

Estimated CQI(1,1)=(P(base station client 1,UE1)/(P(base station client 2,UE3)+alpha+N))+(P(base station client 2,UE3)/(P(base station client 1,UE1)+alpha+N));

Estimated CQI(1,2)=(P(base station client 1,UE2)/(P(base station client 2,UE3)+alpha+N))+(P(base station client 2,UE3)/(P(base station client 1,UE2)+alpha+N))

The cluster CQI in respect of transmission mode (2) is:

Cluster CQI=max(Estimated CQI(1),Estimated CQI(2))

where Estimated CQI(2) represents the case where all 3 base station clients are simultaneously transmitting in the same RB.

In another example, in a scenario where there are 3 base station clients and each base station client is serving 2 UEs, an estimated CQI(base station client,UE) in respect of transmission mode (3) where 2 of the 3 base station clients are simultaneously transmitting in the same RB to the same UE (UE2) is:

Estimated CQI(1)=max(Estimated CQI(1,1),Estimated CQI(1,2))

where

Estimated CQI(1,1)=(P(base station client 1,UE2)+P(base station client 2,UE2))/N;

Estimated CQI(1,2)=(P(base station client 1,UE2)+P(base station client 3,UE2))/N, In this respect, it is envisaged a determination may be made that UE2 is the best served UE in the cluster (for example, the UE with the greatest P(base station client,UE)) before the calculation of Estimated CQI(1) above, and that P(base station client 2,UE2) may be approximated by the RSRP seen at UE2 (that is, P(base station client 2,UE2) may be approximated by the interference of base station client 2 seen at UE2).

And the estimated CQI(base station client,UE) in respect of transmission mode (3) where all of the 3 base station clients are simultaneously transmitting in the same RB to the same UE (UE2) is:

Estimated CQI(2)=(P(base station client 1,UE2)+P(base station client 2,UE2)+P(base station client 3,UE2))/N;

It is envisaged that the cluster CQI determiner 113 may perform the steps mentioned above in a different order in an alternative embodiment. For example, in an alternative embodiment, the cluster CQI determiner 113 may calculate the estimated cluster CQIs for above mentioned transmission mode (2), before comparing the estimated cluster CQIs for above mentioned transmission mode (1) to determine the largest one of the estimated cluster CQIs for above mentioned transmission mode (1). In another embodiment, the cluster CQI determiner 113 may determine the cluster CQI for above mentioned transmission mode (3), before determining the cluster CQI for above mentioned transmission mode (2).

The base station cluster coordinator 110 also comprises a transmission mode selector 116 arranged to evaluate the cluster parameter sets (that is, the cluster CQIs determined by the cluster CQI determiner 113) at the base station cluster coordinator 110, in order to select at least one of the transmission modes for the cluster of base station clients 11a, 12a, 13a.

In use, the transmission mode selector 116 evaluates the cluster CQIs and selects the at least one transmission mode, by firstly comparing the cluster CQIs determined at the cluster CQI determiner 113 in order to determine the largest one of the cluster CQIs, and then selecting the transmission mode corresponding to the largest cluster CQI.

In this embodiment, the transmission mode selector 116 evaluates the cluster CQIs and selects the at least one transmission mode after the cluster CQI determiner 113 determines the cluster CQIs for the above mentioned transmission modes. However, it is envisaged that the transmission mode selector 116 evaluates the cluster CQIs for some of the transmission modes, before the cluster CQI determiner 113 determines the cluster CQI or CQIs for the other one or ones of the transmission modes.

The base station cluster coordinator 110 also comprises an output generator 118 arranged to generate at least one output according to the at least one transmission mode, in order to coordinate one or more downlink transmissions from the cluster of base station clients 11a, 12a, 13a.

The base station cluster coordinator 110 also comprises an output transmitter 119 arranged to transmit each output generated by the output generator 118 to at least one of the base station clients 11a, 12a, 13a to control the at least one base station client 11a, 12a, 13a to perform the one or more downlink transmissions.

Figure 19:
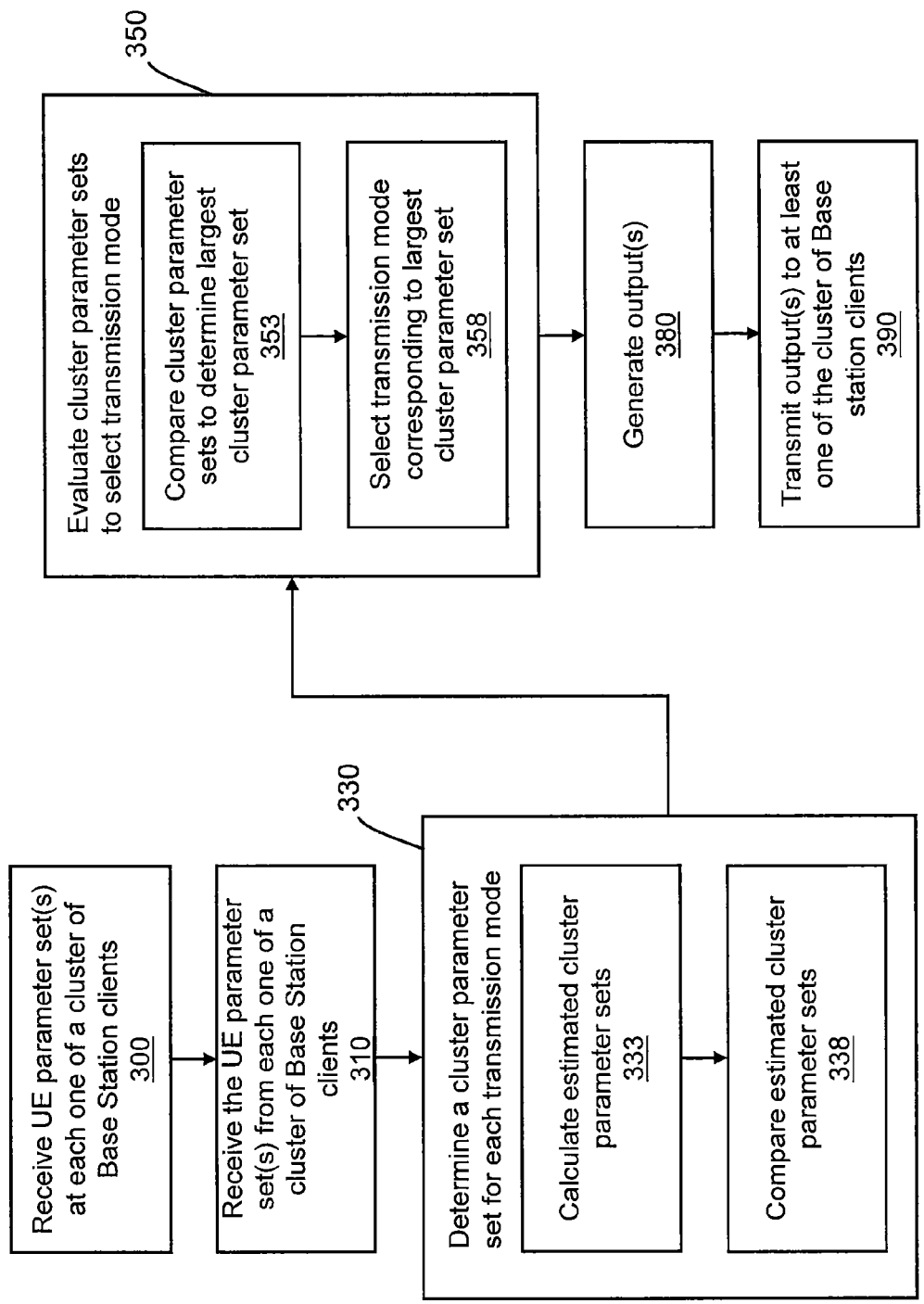
FIG. 19 is a flowchart of another embodiment of a method for coordinating one or more downlink transmissions performed by the base station server and the base station clients of FIG. 1.

FIG. 19 is a flowchart of an embodiment of a method of coordinating one or more downlink transmissions performed by the base station server 110 and the base station clients 11a, 12a, 13a of the wireless communication system 1.

At step 300, a UE parameter set comprising a CQI and a set of RSRPs is received from each UE served by the cluster of base station clients 11a, 12a, 13a, more specifically, by the client UE parameter set receiver 115 of the base station client 11a, 12a, 13a serving the UE (that is, the serving base station client 11a, 12a, 13a).

At step 310, the UE parameter set received by each UE is transmitted from the UE to the serving base station client 11a, 12a, 13a, and the UE parameter set is then transmitted from the serving base station client 11a, 12a, 13a to the base station cluster coordinator 110. As indicated above, the UE parameter set transmitted from the serving base station client 11a, 12a, 13a to the base station cluster coordinator 110 is received by the server UE parameter set receiver 112. Thus, the server UE parameter set receiver 112 receives from each one of the cluster of base station clients 11a, 12a, 13a, a UE parameter set for each UE served by the respective one of the cluster of base station clients 11a, 12a, 13a.

At step 330, a plurality of cluster parameter sets (in the form of cluster CQIs) in respect of respective ones of a plurality of transmission modes at the base station cluster coordinator are determined by the cluster parameter set or cluster CQI determiner 113 of the base station cluster coordinator 110 based on the UE parameter sets received by the server UE parameter set receiver 112. As indicated above, in this embodiment, the transmission modes include (1) a transmission mode where only one of the cluster of base station clients 11a, 12a, 13a performs a downlink transmission, (2) a CoMP CS transmission mode where each one of a subset of the cluster of base station clients 11a, 12a, 13a performs a downlink transmission to a respective one of a plurality of different UEs, (3) a CoMP JP transmission mode where each one of a subset of base station clients 11a, 12a, 13a performs a downlink transmission to the same UE, and (4) a CoMP hybrid transmission mode where each one of a first subset of the cluster of base station clients 11a, 12a, 13a performs a downlink transmission to the same UE, and each one of a second subset of the cluster of base station clients 11a, 12a, 13a performs a downlink transmission to a respective one of a plurality of different UEs.

In order to determine the cluster parameter sets (in the form of cluster CQIs), the cluster parameter set or cluster CQI determiner 113 first calculates, for each transmission mode, a plurality of estimated cluster CQIs based on the CQIs and the sets of RSRPs received by the server UE parameter set receiver 112 at the base station cluster coordinator 110 at step 333. Then, at step 338, the cluster parameter set or cluster CQI determiner 113 compares the estimated cluster CQIs for each transmission mode, in order for the cluster parameter set or cluster CQI determiner 113 to determine the largest one of the estimated cluster CQIs as the cluster CQI for the transmission mode. As indicated above, this may involve a number of intermediate steps. For example, the cluster CQI determiner 113 first calculates the power P(base station client,UE) of a signal received at each UE served by each base station client 11a, 12a, 13a, the signal being received from the base station client 11a, 12a, 13a serving the UE.

At step 350, the cluster parameter sets in respect of the transmission modes determined by the cluster parameter set or cluster CQI determiner 113 are then evaluated by the transmission mode selector 116 of the base station cluster coordinator 110, in order for the transmission mode selector 116 to select at least one of the transmission modes for the cluster of base station clients 11a, 12a, 13a.

More specifically, at step 353, the transmission mode selector 116 first compares the cluster CQIs, in order to determine the largest one of the cluster CQIs. Then, at step 358, the transmission mode selector 116 selects the transmission mode corresponding to the largest cluster CQI.

At step 380, the output generator 118 of the base station cluster coordinator 110 generates one or more outputs, depending on the transmission mode selected by the transmission mode selector 116.

The output transmitter 119 of the base station cluster coordinator 110 then transmits each output generated by the output generator 118 to at least one of the base station clients 11a, 12a, 13a to control the at least one base station client 11a, 12a, 13a to perform the one or more downlink transmissions.

In this embodiment, there is a corresponding downlink transmission buffer (such as a RLC buffer) comprising at least one packet earmarked for downlink transmission from each one of the base station clients 11a, 12a, 13a, and the one or more downlink transmissions coordinated by the base station cluster coordinator 110 represent one or more of the packets of the downlink transmission buffers that are earmarked for downlink transmission. In this respect, it is envisaged that the base station cluster coordinator 110 may need to perform a number of rounds of coordinating downlink transmissions to coordinate the downlink transmission of all of the packets of the downlink transmission buffers that are earmarked for downlink transmission.

In this embodiment, each round of coordinating downlink transmissions is performed by the base station cluster coordinator 110 every Transmission Time Interval (TTI). However, it is envisaged that this needs not be the case in an alternative embodiment. For example, in an alternative embodiment, the method for coordinating downlink transmissions may be performed only every other TTI, or only in response to instructions from a Mobility Management Entity (MME). Also, it is envisaged that some of the steps above may be performed every TTI, but others may not be performed every TTI, in an alternative embodiment. For example, the server UE parameter set receiver 112 may not receive a UE parameter set from each UE every TTI, but the transmission mode selector 116 may select a new transmission mode for the cluster every TTI.

It is envisaged that not all of the steps of FIG. 19 may be performed in each round in an alternative embodiment. For example, as mentioned above, a UE may in an alternative embodiment only report a UE parameter set to a base station client 11a, 12a, 13a at every other TTI (or even a-periodically) at step 300 in each round of coordinating downlink transmissions, and the cluster parameter sets determined at step 330 may be based on one or more UE parameter sets previously received at step 300 in a round of coordinating downlink transmissions that was performed many rounds prior to the present round. In this respect, it is envisaged that, in an alternative embodiment, the base station server 10 may request a base station client 11a, 12a, 13a to request a UE to report a UE parameter set (for example, in a next TTI), upon determining that a previously reported UE parameter set is expired or not available.

In respect of step 330, it is envisaged that the cluster parameter set determiner 113 may not calculate a cluster parameter set in respect of all of the transmission modes in an alternative embodiment. For example, in an alternative embodiment, the cluster parameter set determiner 113 may determine the cluster parameters sets in respect of transmission modes (1) and (2) and the transmission mode selector 116 may select one of transmission modes (1) and (2), without the cluster parameter set determiner 113 determining a cluster parameter set in respect of transmission mode (3).

Further Examples

Figure 5:
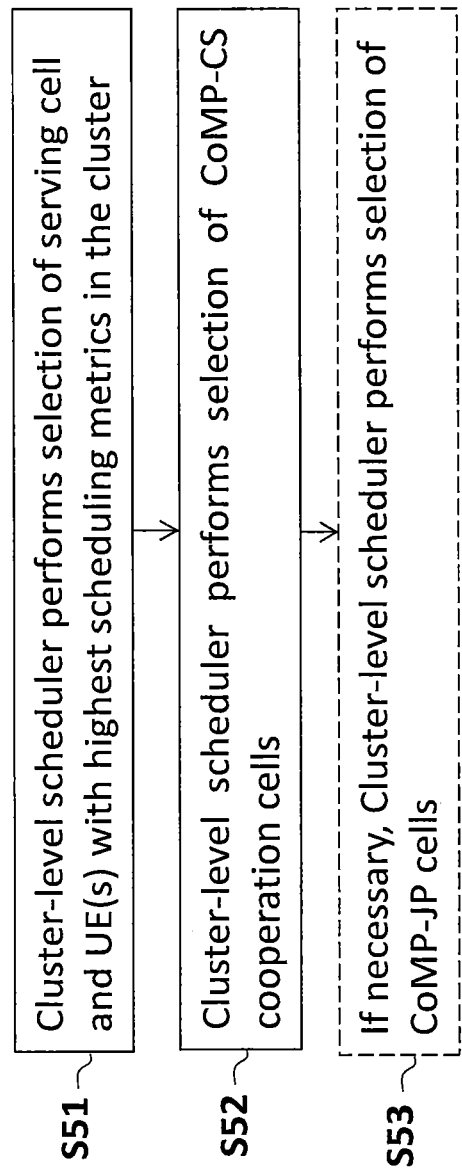
FIG. 5 is a flow diagram of an example of an embodiment of a method for coordinating one or more downlink transmissions.

FIG. 5 is a flow diagram of an example of another embodiment of a method for coordinating one or more downlink transmissions. In the example, there is a packet for transmission from each one of the base station clients 11a, 12a, 13a to each one of two UEs served by a respective one of the base station clients 11a, 12a, 13a. That is, each base station client 11a, 12a, 13a has a packet for transmission to two UEs served by the base station client 11a, 12a, 13a. Also, there is available for selection different types of transmission modes including a CoMP CS transmission mode and a CoMP JP transmission mode (for example, non-coherent CoMP JP transmission mode), and an appropriate interference coordination scheme (or transmission mode) may be adaptively selected in response to varying conditions.

Firstly, at step S51, the cluster level scheduler (that is, the cluster packet scheduler 22 of the base station server 10) uses UE parameter sets (for example, UE parameter sets comprising CQIs and RSRPs) reported from UEs in the cluster of base station clients 11a, 12a, 13a to calculate scheduling metrics (for example, in the form of the receipt power of a signal transmitted from a base station client 11a, 12a, 13a to a UE) for each Resource Block (RB) for each UE in the cluster of base station clients 11a, 12a, 13a (that is, for each UE served by the cluster of base station clients 11a, 12a, 13a), by excluding interference due to transmission from the cluster of base station clients 11a, 12a, 13a to the other UEs in the cluster of base station clients 11a, 12a, 13a. Aggregate scheduling metrics in the form of estimated cluster CQIs (CQI'(NON-CS)) are then calculated for a transmission mode where only one of the cluster of base station clients 11a, 12a, 13a performs a downlink transmission (that is, above mentioned transmission mode (1)).

Then, at step S52, the cluster level scheduler (or cluster packet scheduler) 22 calculates aggregate scheduling metrics (that is, estimated cluster CQIs) for a CoMP CS transmission mode where each one of a subset of the cluster of base station clients 11a, 12a, 13a (that is, a set of cooperating cells) performs a downlink transmission to a respective one of a plurality of different UEs (that is, above mentioned transmission mode (2)), and compares the aggregate scheduling metrics (that is, the estimated cluster CQIs) for transmission mode (1) and the aggregate scheduling metrics (that is, the estimated cluster CQIs) for transmission mode (2).

At step S53, the cluster level scheduler (or cluster packet scheduler) 22 calculates aggregate scheduling metrics for a CoMP JP transmission mode where each one of a subset of base station clients 11a, 12a, 13a (assuming that there are available radio resources (that is, RBs)) performs a downlink transmission to the same UE (that is, above mentioned transmission mode (3)) after step S51 or step 52, and compares the aggregate scheduling metrics (that is, the estimated cluster CQIs) for transmission mode (2) and the aggregate scheduling metrics (that is, the estimated cluster CQIs) for transmission mode (3).

It is envisaged that steps S51, S52 and S53 may be in respect of one RB or a RB group (that is, multiple RBs) depending on the embodiment. For example, in another example, the cluster level scheduler (or cluster packet scheduler) 22 may calculate aggregate scheduling metrics for a RB group comprising 2, 4, 6 or 8 RBs.

In the example above, the UE with the highest receipt power is selected by the cluster level scheduler (or cluster packet scheduler) 22 at step S51. However, it is envisaged that in another example, another scheduling metric such as a maximum throughput may be used by the cluster level scheduler (or cluster packet scheduler) 22. It is also envisaged that the cluster level scheduler (or cluster packet scheduler) 22 may alternatively select a UE based on priority (such that the UE with the highest priority is selected) rather than a scheduling metric in another example. It is also envisaged that a selection or selections by the cluster level scheduler (or cluster packet scheduler) 22 may alternatively be based on packet scheduling algorithms such as proportional fairness (PF), maximum-largest weighted delay first (M-LWDF) etc.

Also, it is envisaged that the cluster level scheduler (or cluster packet scheduler) 22 may select multiple UEs at step S51 (rather than just one UE) in another example where multi-user Multiple Input Multiple Output (MIMO) is used by in the cells.

In the above example, each UE parameter set comprises a CQI and a set of RSRP (or alternatively a set of RSRQs). However, it is envisaged that one or more of the UE parameter sets may alternatively or additionally comprise a Quality of Service (QoS) requirement, and that one or more selection by the cluster level scheduler (or cluster packet scheduler) 22 may be based on such a QoS requirement or requirements.

Finally, it is envisaged that the CoMP JP transmission mode may incorporate other processing techniques in another example. For example, it is envisaged that in another example, the CoMP JP transmission mode may incorporate Space-Time Block Coding (STBC) or Space-Frequency Block Coding (SFBC). In another example, the CoMP JP transmission mode may incorporate a downlink transmission mode similar to the one used in Multimedia Broadcast and Multicast Services (MBMS), in which the same signal is transmitted using different transmission modes, and received signals are combined in a spatial domain.

Figure 6:
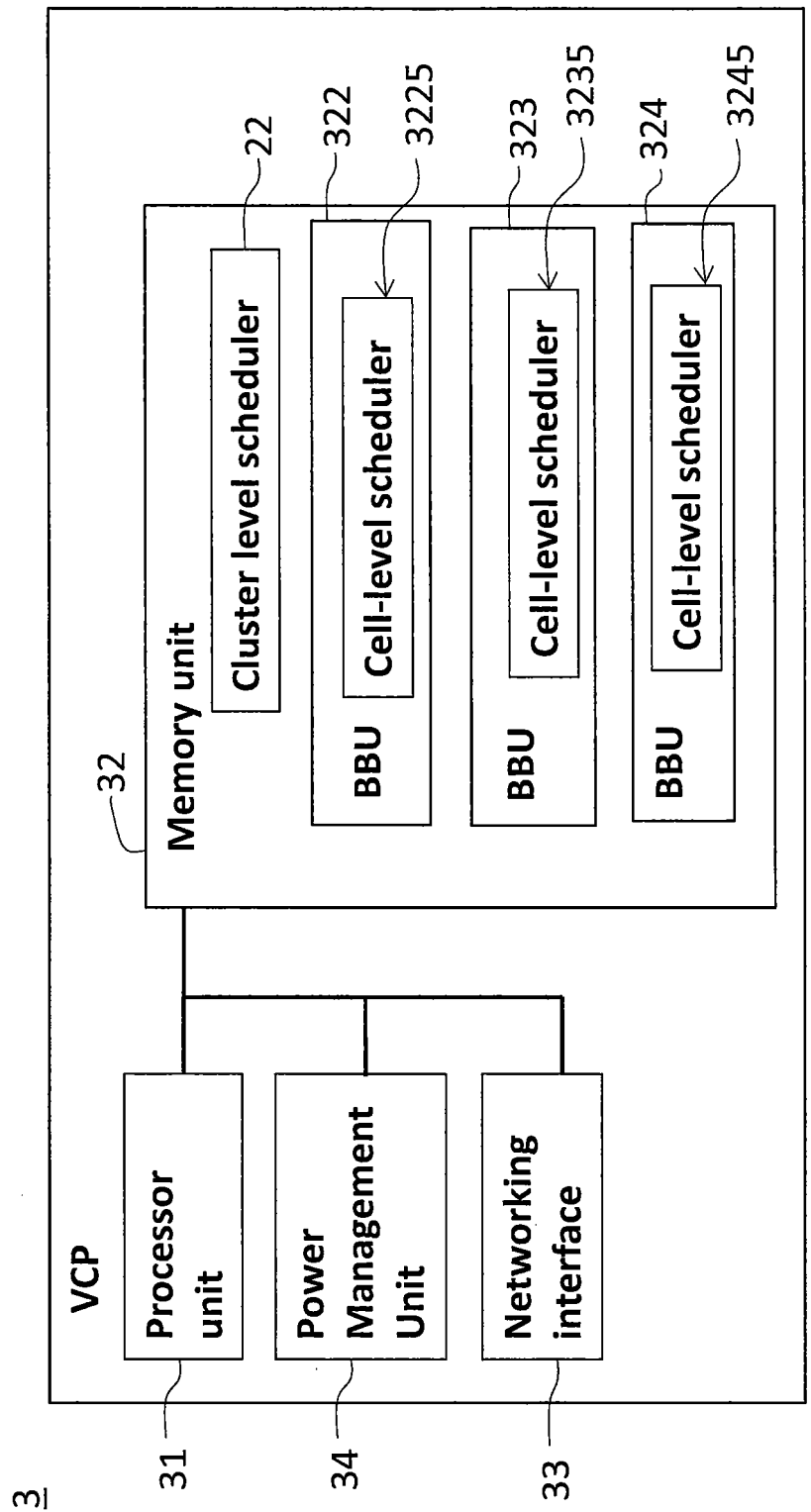
FIG. 6 is schematic diagram of some of the physical components of a base station server.

FIG. 6 is schematic diagram of some of the physical components of a base station server. In particular, the FIG. 6 illustrates a VCP 3 implemented by an example of a base station server. The VCP 3 includes computer program or software code 22 for implementing at least one cluster level scheduler (or cluster packet scheduler) 22 and computer program or software code 322, 323, 324 for implementing each one of a plurality of BBUs 21 including computer program or software code 3225, 3235, 3245 for implementing cell-level schedulers.

In FIG. 6, the cluster level scheduler (or cluster packet scheduler) 22 of the VCP 3 is arranged to receive channel quality metrics (such as CQIs and RSRPs) of the UEs served by base station clients corresponding to the BBUs 21 and the cell-level schedulers. In use, the BBUs 21 receive channel quality metrics (such as CQI and RSRPs) of all UEs in their respective radio service coverage area, and then report the received channel quality metrics (such as CQI and RSRPs) to the cluster level scheduler (or cluster packet scheduler) 22. The cluster level scheduler (or cluster packet scheduler) 22 then calculates reference signal received quality metrics of respective ones of the UEs. The cell-level schedulers of the BBUs 21 is configured to provide updates of the buffering status of respective cells for a pre-configured duration (such as a TTI) to the cluster level scheduler (or cluster packet scheduler) 22. The cluster level scheduler (or cluster packet scheduler) 22 is arranged to determine the available RBs at each cell.

Figure 7:
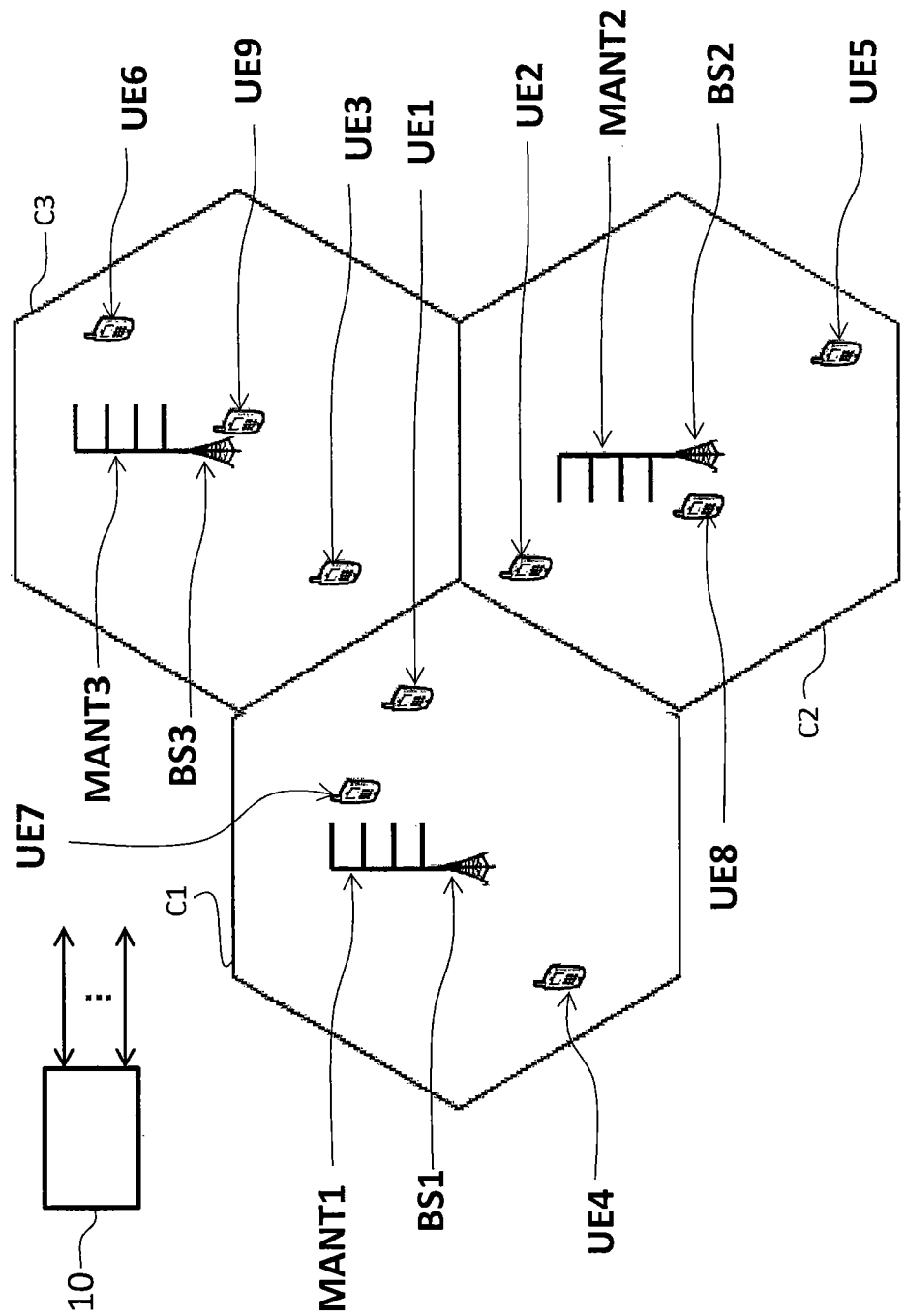
FIG. 7 is a schematic diagram of a scenario involving a wireless communication system.

FIG. 7 is a schematic diagram of a scenario involving an embodiment of the wireless communication system 1 comprising a cluster of 3 cells.

In FIG. 7, the base station clients 11a, 12a, 13a are indicated by BS1, BS2 and BS3, and each base station client 11a, 12a, 13a defines a respective one of three cells C1, C2 and C3 indicating the intended boundary of the coverage provided by the respective base station client 11a, 12a, 13a. The UE served by the base station clients 11a, 12a, 13a are indicated by UE1, UE2, UE3, UE4, UE5, UE6, UE7, UE8 and UE9.

In this example, each base station client 11a, 12a, 13a uses multiple antennas MANT1, MANT2, MANT3 located at the centre of a respective one of the above mentioned cells. More specifically, each base station client 11a, 12a, 13a uses a multiple antenna apparatus including four different antennas. A person skilled in the art will appreciate that since there are only four antennas at each cell, the downlink transmission capability in the present example may be termed as Rank-4. In this example, each antenna is an omni-directional antenna, but persons skilled in the art will appreciate that one or more of the antennas may be a directional antenna. For example, each base station client in the wireless communication network may use 3-sector antennas located at the centre of the cell, each of the 3-sector antennas of the base station client respectively serving a respective one of 3 sectors.

As indicated in FIG. 7, the base station clients BS1, BS2, BS3 are connected to the VCP 10 of a base station server 10. The base station clients BS1, BS2, BS3 are connected to base station server 10 comprising respective BBUs corresponding to the base station clients, and the cell-level scheduler (that is, the cluster packet scheduler 22) of each BBU of the base station server 10 respectively corresponding to the base station clients BS1, BS2, BS3 are configured to report received CQIs of UEs to the cluster level scheduler (or cluster packet scheduler) 22.

At TTI "t−1", the UEs UE1-UE6 respectively report their measured CQI values and preferred Precoding Matrix Indicator (PMI) values to their currently serving base station clients BS1, BS2, BS3. At the base station server, 10, the cell-level scheduler 22 of each BBU respectively corresponding to the base station clients BS1, BS2, BS3 then receive the reported CQI values. Since the base station clients BS1, BS2, BS3 are connected to the VCP 10 of the base station server 10, the cell-level scheduler 22 of each BBU respectively corresponding to the base station clients BS1, BS2, BS3 may also report the received CQIs of UEs UE1-UE6 to their cluster level scheduler (or cluster packet scheduler) 22.

Then, the cluster level scheduler (or cluster packet scheduler) 22 of the VCP 10 corresponding to the cluster consisting of base station clients BS1, BS2, BS3 calculates a reference signal received quality metric for UEs UE1, UE4, UE7 in cell C1, a reference signal received quality metric for UEs UE2, UE5, UE8 in cell C2, and a reference signal received quality metric for UEs UE3, UE6, UE9 in cell C3.

Then, at each TTI, the cluster level scheduler (or cluster packet scheduler) 22 performs a selection of a serving cell and UE(s) with the highest scheduling metric(s) in the cluster of cells, based on channel quality metrics (such as CQIs) and Quality of Service (QoS) requirements, by applying packet scheduling algorithms such as proportional fairness (PF), maximum-largest weighted delay first (M-LWDF) etc.

The cluster level scheduler (or cluster packet scheduler) 22 may schedule UEs at different RBs instead of at a single pool of RBs. Below is a table showing an example of such packet scheduling:

| RB # | Scheduling at BS1 | Scheduling at BS2 | Scheduling at BS3 |
|---|---|---|---|
| k | UE4 | N/A | N/A |
| k + 1 | N/A | UE5 | N/A |
| k + 2 | N/A | N/A | UE6 |
| k + 3 | N/A | UE2 | N/A |
| k + 4 | N/A | N/A | UE9 |
| k + 5 | UE7 | N/A | N/A |
| ~ | ~ | ~ | ~ |

At RB "k", the cluster level scheduler (or cluster packet scheduler) 22 schedules for a downlink transmission at UE4. At RB "k+1", the cluster level scheduler (or cluster packet scheduler) 22 schedules for a downlink transmission at UE5. At RB "k+2", the cluster level scheduler (or cluster packet scheduler) 22 schedules for a downlink transmission at UE6. At RB "k+3", the cluster level scheduler (or cluster packet scheduler) 22 schedules for a downlink transmission at UE2. At RB "k+4", the cluster level scheduler (or cluster packet scheduler) 22 schedules for a downlink transmission at UE9. At RB "k+5", the cluster level scheduler (or cluster packet scheduler) 22 schedules for a downlink transmission at UE7.

A more mathematical description of the steps of FIG. 5 is provided here.

The set of base station clients is denoted $v$, with the cardinality $\|v\|=V$, and the set of UEs in the cluster is denoted as $\mathcal{U}$ with the cardinality $\|\mathcal{U}\|=U$. Also, on RB "k", the set of co-channel cells (or base station clients) is denoted as $v^k$ with cardinality $\|v^k\|=I \leq V$, and the set of co-channel UEs is denoted as $\mathcal{U}^k$. Accordingly, the set of UEs with the serving cell $v$ selected on RB "k" for a given TTI "t" may be denoted $v \in v^k$. Also, $R_u^{mod}(S)$ denotes an achievable rate of UEs u under a cooperative mode mod with a cooperative base station client set S.

The set of cooperating UEs on a particular RB "t" in a cluster is denoted as $\mathcal{U}^k$, and the parameters $\vartheta$ and ($\vartheta$+mod) denote respectively the set of interference coordination schemes (or transmission modes) that may be applied. A new transmission mode may be selected if the following condition is satisfied:

$$R_{\mathcal{U}^k} \vartheta < R_{\mathcal{U}^k} (\vartheta + mod)$$

where $R_{\mathcal{U}^k} \vartheta$ is an achievable sum rate of a co-channel UE set $\mathcal{U}^k$ for a particular interference coordination scheme (or transmission mode) $\vartheta$, and $R_{\mathcal{U}^k} (\vartheta + mod)$ is an achievable sum rate of a new interference coordination scheme (or a new transmission mode) for the same co-channel UE set $\mathcal{U}^k$.

At step S51, the cluster level scheduler (or cluster packet scheduler) 22 selects a UE (in case of SU-MIMO) or a set of UEs (in case of MU-MIMO) $u_v$ with the highest scheduling priority (and such selection of UE(s) and the serving cell may for example achieve a maximum rate $R_u^{Non-cooperation}$) in the cluster, and then respectively updates the co-channel base station clients set $v^k$, the base station clients set $v$ in the cluster, the co-channel UEs set $\mathcal{U}^k$, the interference coordination schemes set $\vartheta$ after the introduction of a new mode according to following mathematical expressions:

$$v^k = v^k + \{v\}$$

$$v = v - \{v\}$$

$$\mathcal{U}^k = \mathcal{U}^k + \{u_v\}$$

$$\vartheta = (\vartheta + mod)$$

At step S52, the cluster level scheduler (or cluster packet scheduler) 22 performs a selection of CoMP CS Cell(s) to select CoMP CS cooperative cell(s), for the selection result made in step S51. Here, the set of base station clients selected for CoMP CS cooperative (that is, the cooperative base station set) is denoted CS(S). For each RB "k", the cluster level scheduler (or cluster packet scheduler) 22 performs the following algorithm (the CoMP JP algorithm) in order to determine the set of CoMP CS coordinated UE(s) which is denoted $u_v$:

---
Data: $V^k$, V, $U^k$, $\vartheta$
% Cooperative base station/UE set without performing CoMP CS algorithm
Result: $V^k$, V, $U^k$, $\vartheta$
% Cooperative base station/UE set with performing CoMP CS algorithm
begin for (i ∈ V) do
    while (V ≠ ∅) do
        S ≠ ∅
        for (j ∈ $\mathcal{U}_i$) do
          if ($R_{(u^k)} < R_{(u^k+\{j\})}$) then
          [S = S + {j}],  % The candidate UE Set
    if (S ≠ ∅) then
        $l_g^* = \arg\max_{l \in S}[R_{(u^k+\{j\})}]$;
        % Find the UE(s) and the serving cell g
        with maximum system throughput
        $\vartheta = \vartheta + CS(V^k, g)$;
        $V^k = V^k + \{g\}$;
        $\mathcal{U}^k = \mathcal{U}^k + \{l_g^*\}$;
        V = V − {g}
---

Figure 8:
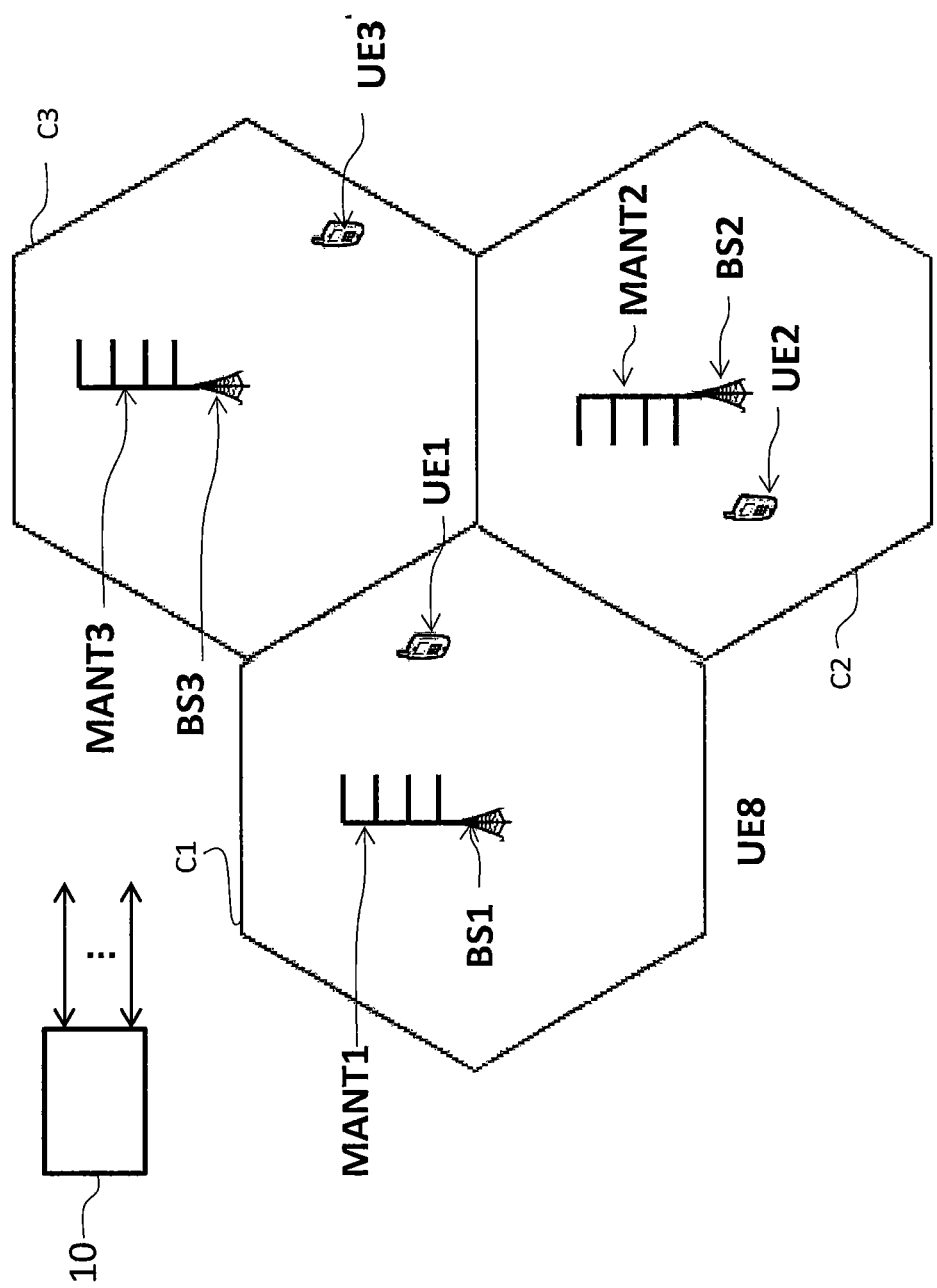
FIGS. 8 and 9 are schematic diagrams illustrating another scenario involving a wireless communication system.
Figure 9:
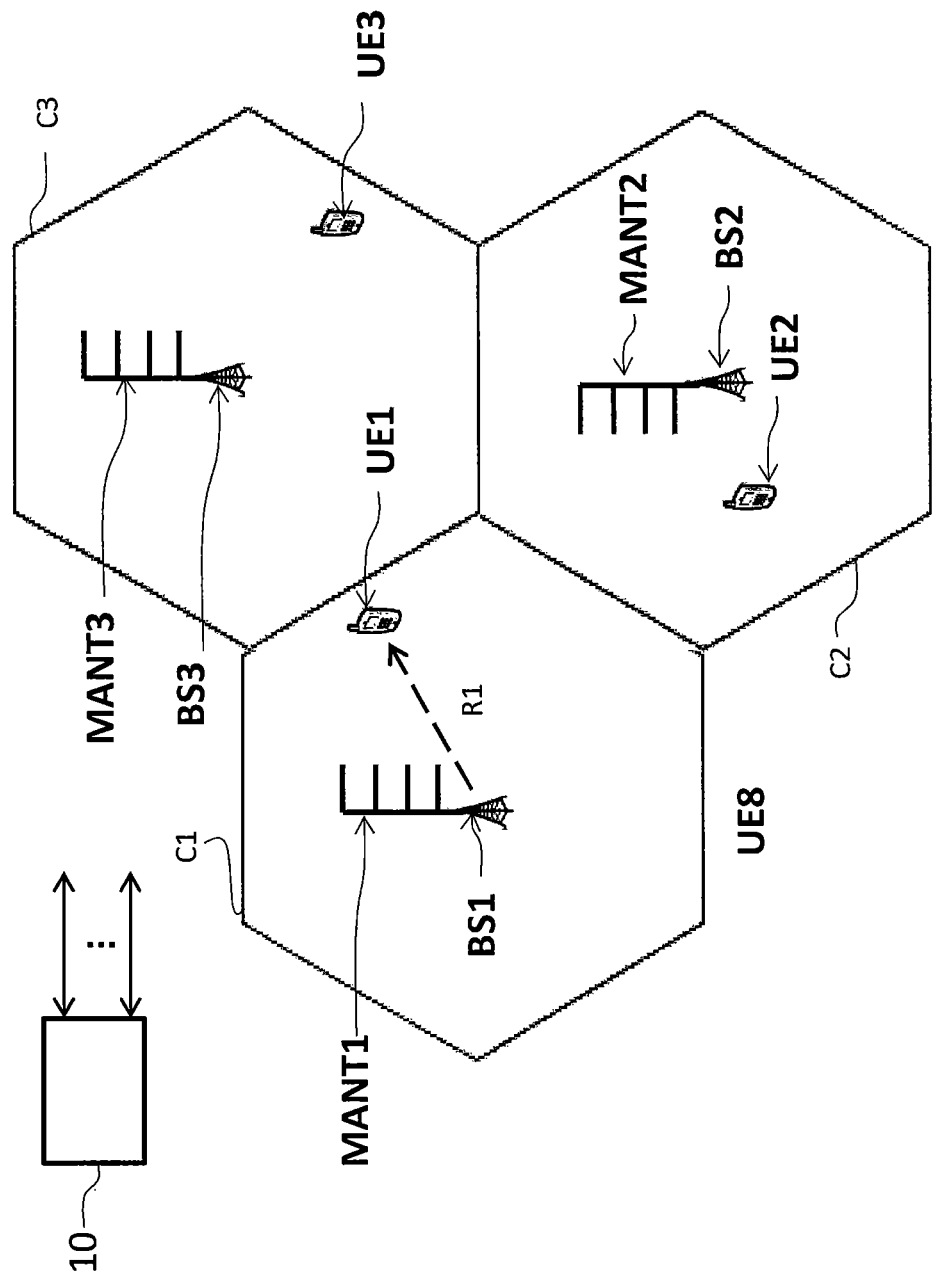

FIGS. 8 and 9 are schematic diagrams illustrating a scenario involving an embodiment of the wireless communication system. In particular, the figures together illustrate an exemplary scenario of how switching between non-CoMP and CoMP CS downlink transmission schemes may occur according to the steps of FIG. 5.

In this scenario, the base station BS1 cannot perform a CoMP CS downlink transmission to BS1 without step S52 of FIG. 5, and the system throughput to the user equipment UE1 is R1. In the example shown in FIG. 7, the interference coordination scheme $\vartheta$ is previously a non-CoMP transmission scheme. At step S52, the cluster level scheduler (or cluster packet scheduler) 22 determines that an updated interference coordination scheme $\vartheta$ has aggregate system throughput (or system sum rate) R1'+R2 greater than the original system throughput R1 (that is, (R1'+R2)>R1). The updated interference coordination scheme is a CoMP CS transmission scheme, and the base station clients BS1 and BS2 are configured by the cluster level scheduler (or cluster packet scheduler) 22 to respectively perform downlink transmissions to the UEs UE1 and UE2 with rates R1' and R2. The aggregate system throughput under such a CoMP CS downlink transmission scheme is R1'+R2. In this example, the base station BS2 in cell 2 is either selected by the cluster level scheduler (or cluster packet scheduler) 22 as a candidate of the CoMP CS cooperative set at RB "k" or muted at RB "k".

At step S53, the cluster level scheduler (or cluster packet scheduler) 22 performs a selection of CoMP JP Cell(s). The set of base station S that may perform CoMP JP cooperative is denoted JP(S), and the system sum rate with the set of base station S with CoMP JP cooperation (that is, the base station JP cooperative set S) is denoted as $R^{JP(S)}$. The set of transmission and coordination schemes (or the interference coordination scheme) applied to the wireless communication system is denoted $\vartheta$. For each RB "k", the selection of CoMP-JS cells (the CoMP CS algorithm) is performed according to the following algorithm (2) to determine the CoMP JP coordinated cells:

---
Data: $V^k$, V, $\vartheta$
% Cooperative base station/UE set without performing CoMP JP algorithm
Result: $V^k$, V, $\vartheta$
% Cooperative base station/UE set with performing CoMP JP algorithm
begin for (i ∈ V) do
    $\mathcal{L} = \emptyset$;
    for (j ∈ $V^k$) do
        if $\left(R_{u^k}^{\vartheta}(V^k) < R_{u^k}^{(\vartheta + JP\{i,j\})}(V^k + \{i\})\right)$
        [$\mathcal{L} = \mathcal{L} + \{i\}$
    if ($\mathcal{L} \neq \emptyset$) then
        $\overline{I} = \arg\max_{l \in \mathcal{L}} \left[R_{u^k}^{(\vartheta + JP\{i,j\})}(V^k + \{i\})\right]$;
        % Find the TPs
        with maximum JP system throughput
        $V^k = V^k + i$;
---

In the above algorithm, the parameter L represents the set of CoMP JP cell(s), and the parameter $\overline{I}$ represents the currently selected cell that may result in a updated system sum rate $R_{u^k}^{(\vartheta + JP(i,j))}(v^k + \{i\})$ that is greater than a previously determined system sum rate $R_{u^k}^{\vartheta}(v^k)$ (that is, one without the cell $\overline{I}$).

Figure 10:
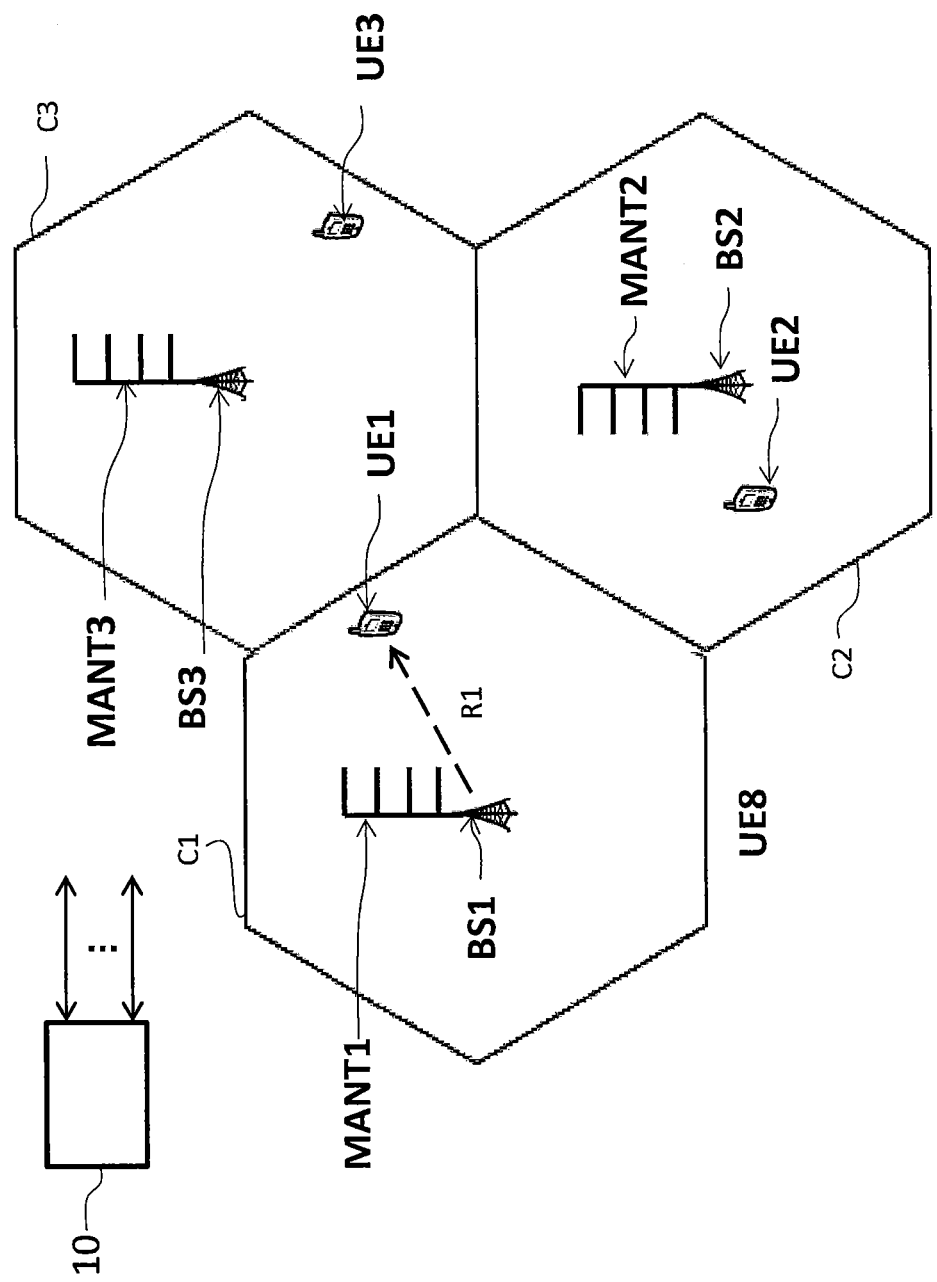
FIGS. 10 and 11 are schematic diagrams illustrating another scenario involving a wireless communication system.
Figure 11:
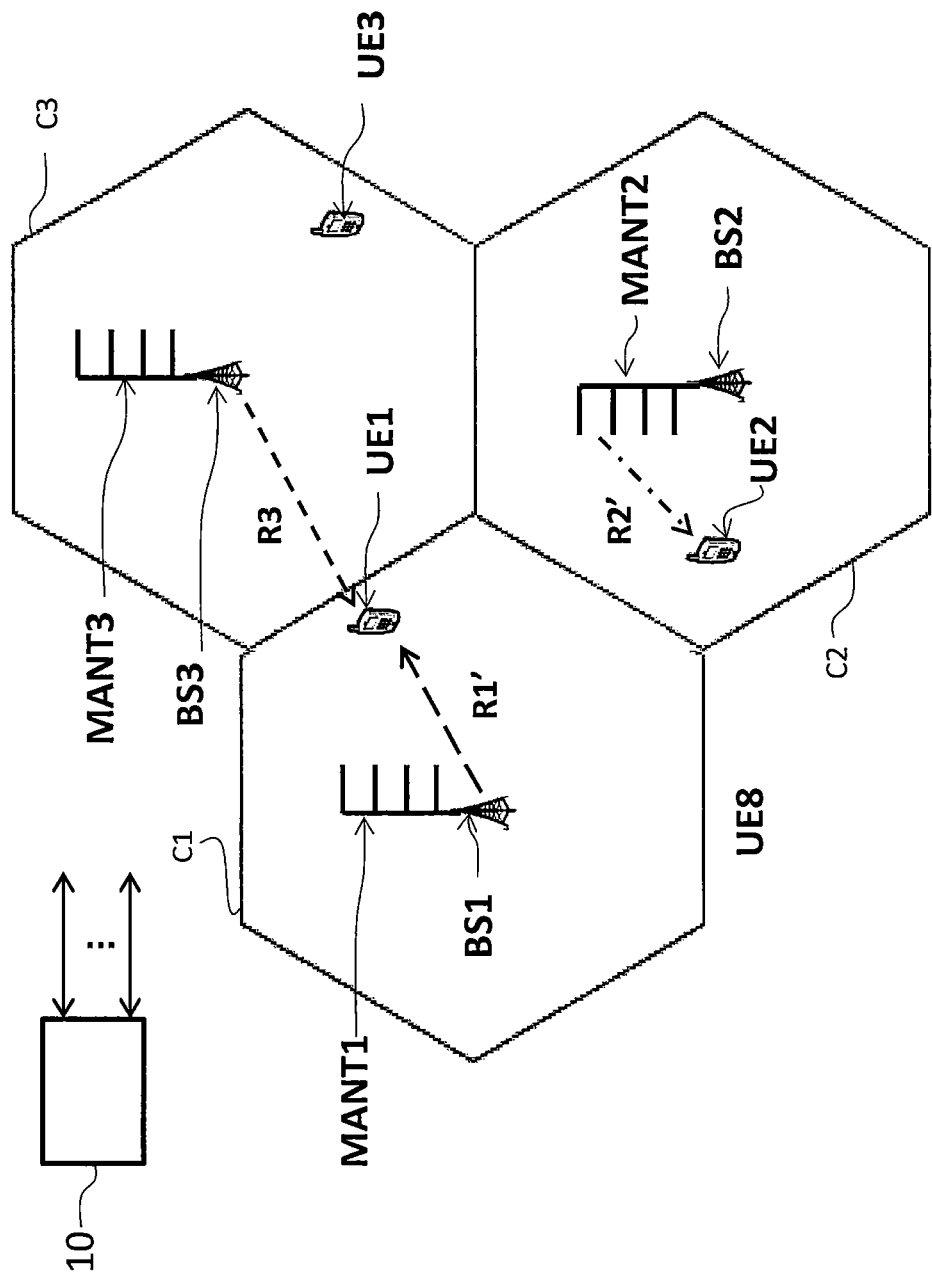

FIGS. 10 and 11 are schematic diagrams illustrating another scenario involving an embodiment of the wireless communication system. In particular, the figures together illustrate an exemplary scenario of how switching between a non-CoMP transmission scheme and a CoMP JP downlink transmission scheme may occur.

As indicated above in respect to FIG. 8, an example of CoMP CS downlink transmissions, from base station clients BS1 and BS2 to the UE1 and UE2, has an aggregate system throughput R1'+R2. In FIG. 10, after step S53, the cluster level scheduler (or cluster packet scheduler) 22 determines to select the base station client BS3 in the cell 3 for CoMP JP cooperation, and configures base station client BS3 to perform a CoMP JP transmission to UE1 from base station client BS3. For example, cell 3 is selected for CoMP JP transmission because the system sum rate using CoMP JP transmission R1'+R2'+R3 is greater than the system sum rate using CoMP CS transmission R1'+R2 (that is, (R1'+R2'+R3)>(R1'+R2)).

In FIG. 11, cell 3 is selected by the cluster level scheduler (or cluster packet scheduler) 22 to join cell 1 in performing CoMP JP transmissions to UE1. Both cell C1 and cell C3 transmit the same data to UE1 in the CoMP-JP transmission scheme. It is envisaged that this may be a similar fashion as the transmission scheme used in Multimedia Broadcast Multicast Services (MBMS).

Figure 12:
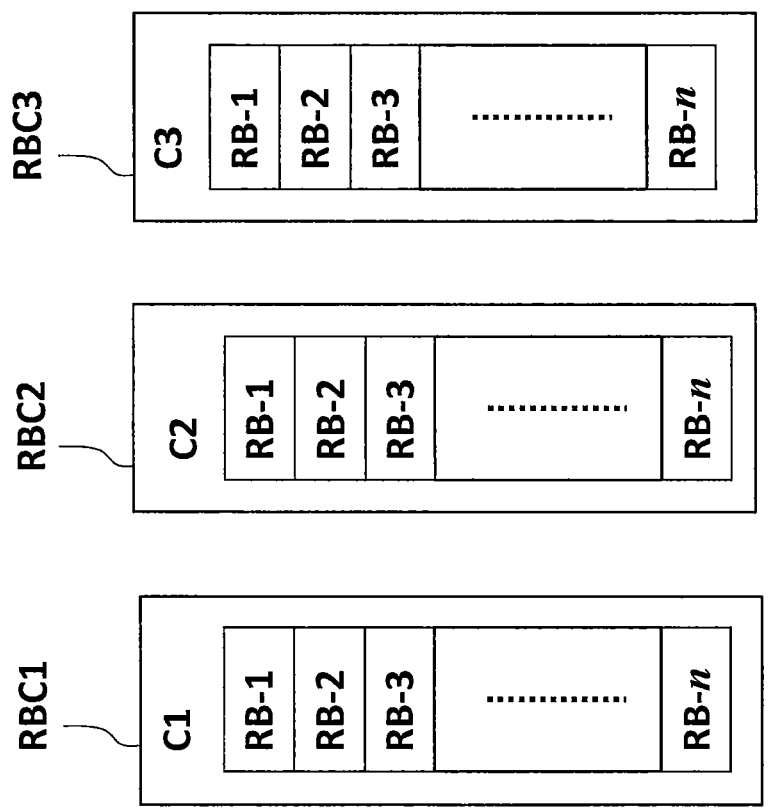
FIG. 12 is a schematic diagram of the resources available in a wireless communication system.

FIG. 12 illustrates how separate RBs are managed by different cells in a wireless communication system. Conventionally, the cells C1, C2, C3 respectively manage only its RBs RB-1, RB-2, RB-3, RB-4, RB-5 and RB-6. As illustrated in FIG. 12, the cluster level scheduler (or cluster packet scheduler) 22 connected to the BBUs 21 corresponding to the cells C1, C2, C3 is aware of a pool of RBs RBC1, RBC2, RBC3 including the RBs in all three cells RB-1, RB-2, RB-3, RB-n in each cell C1, C2 and C3. Thus, in contrast to a conventional setup, the cluster level scheduler (or cluster packet scheduler) 22 regards that the entire cluster possess only one pool of RBs (instead of three pools of RBs).

FIG. 13 illustrates an example of scheduling metrics corresponding to different UEs. At a given TTI "t", according to a PF algorithm, the cluster level scheduler (or cluster packet scheduler) 22 calculates for UEs UE1, UE4, UE7 in cell C1 the scheduling metrics $m_{1,1}$, $m_{1,2}$, $m_{1,3}$, for UEs UE2, UE5, UE8 in cell C2 the scheduling metrics $m_{2,1}$, $m_{2,2}$, $m_{2,3}$, and for UEs UE3, UE6, UE9 in cell C3 the scheduling metrics $m_{3,1}$, $m_{3,2}$, $m_{3,3}$.

It is envisaged that the cluster level scheduler (or cluster packet scheduler) 22 may calculate the scheduling metrics according to the respective amount of buffered data (that is, the amount of data buffered at each currently serving base station) for transmission and average waiting time or channel quality metrics (such as CQI and RSRPs).

Figure 14:
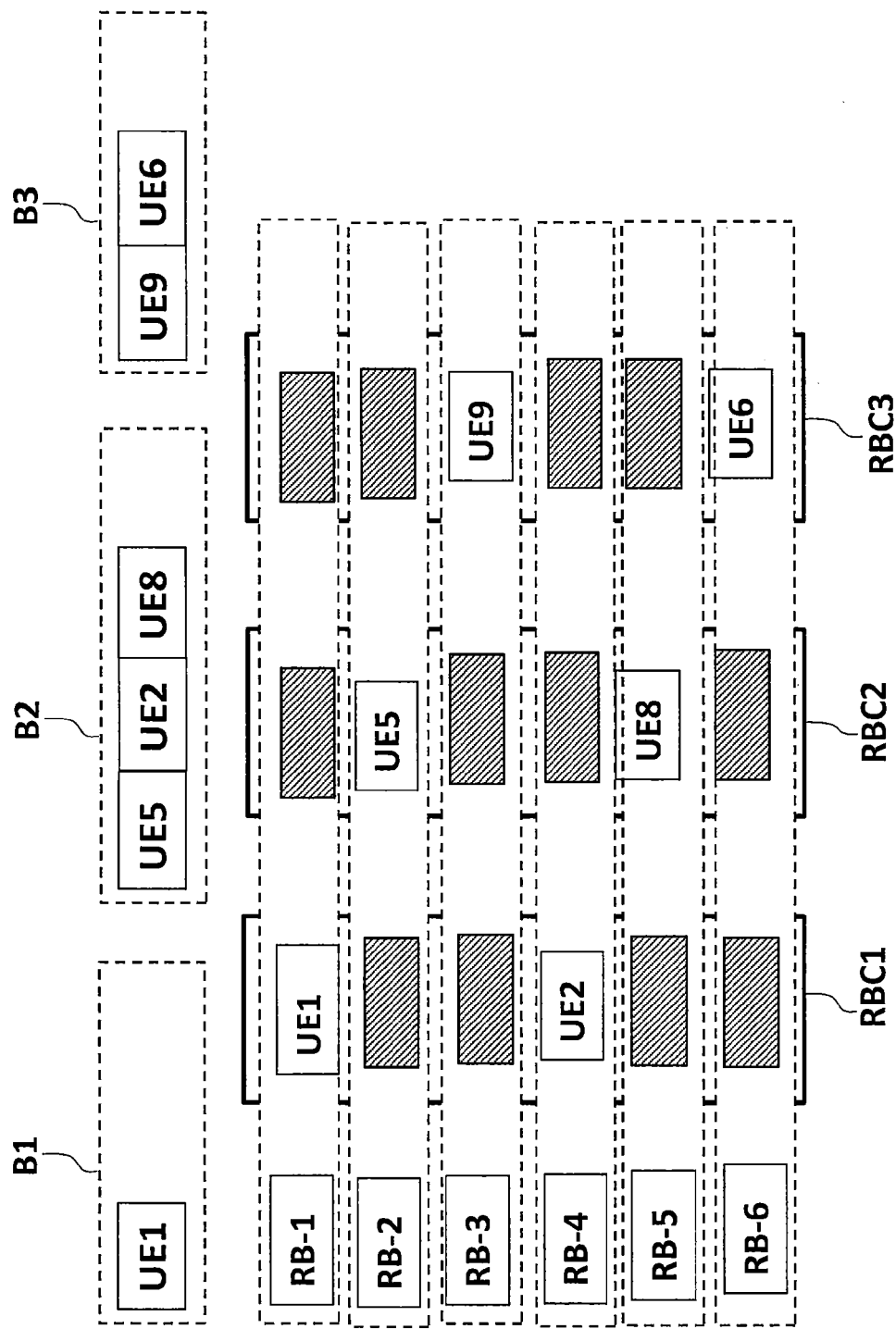
FIG. 14 is a schematic diagram of an example of how resources are allocated in a wireless communication system.

FIG. 14 illustrates an example of how RBs may be allocated to different UEs according to the RLC buffers of the cells. In the figure, traffic load is light and the number of available RBs is greater than the number of buffered packets for transmission. As illustrated at the top of the figure, there is packet for transmission to UE1 in RLC sub-layer buffer B1, packets for transmission to UE5, UE2 and UE8 respectively in RLC sub-layer buffer B2, and packets for transmission to UE9 and UE6 respectively, in RLC sub-layer buffer B3.

In FIG. 14, the cluster level scheduler (or cluster packet scheduler) 22 allocates RB-1 to UE1, RB-2 to UE5, RB-3 to UE9, RB-4 to UE3, RB-5 to UE8, and RB-6 to UE6. In this example, since the number of available RBs is greater than the number of buffered packets for transmission, the cluster level scheduler (or cluster packet scheduler) 22 need not consider a CoMP-CS transmission scheme or a CoMP-JP transmission scheme. Also, inter-cell interference in the cluster is avoided by centralizing the coordination of downlink transmissions by using resource allocation or packet scheduling at the cluster level scheduler (or cluster packet scheduler) 22.

Figure 15:
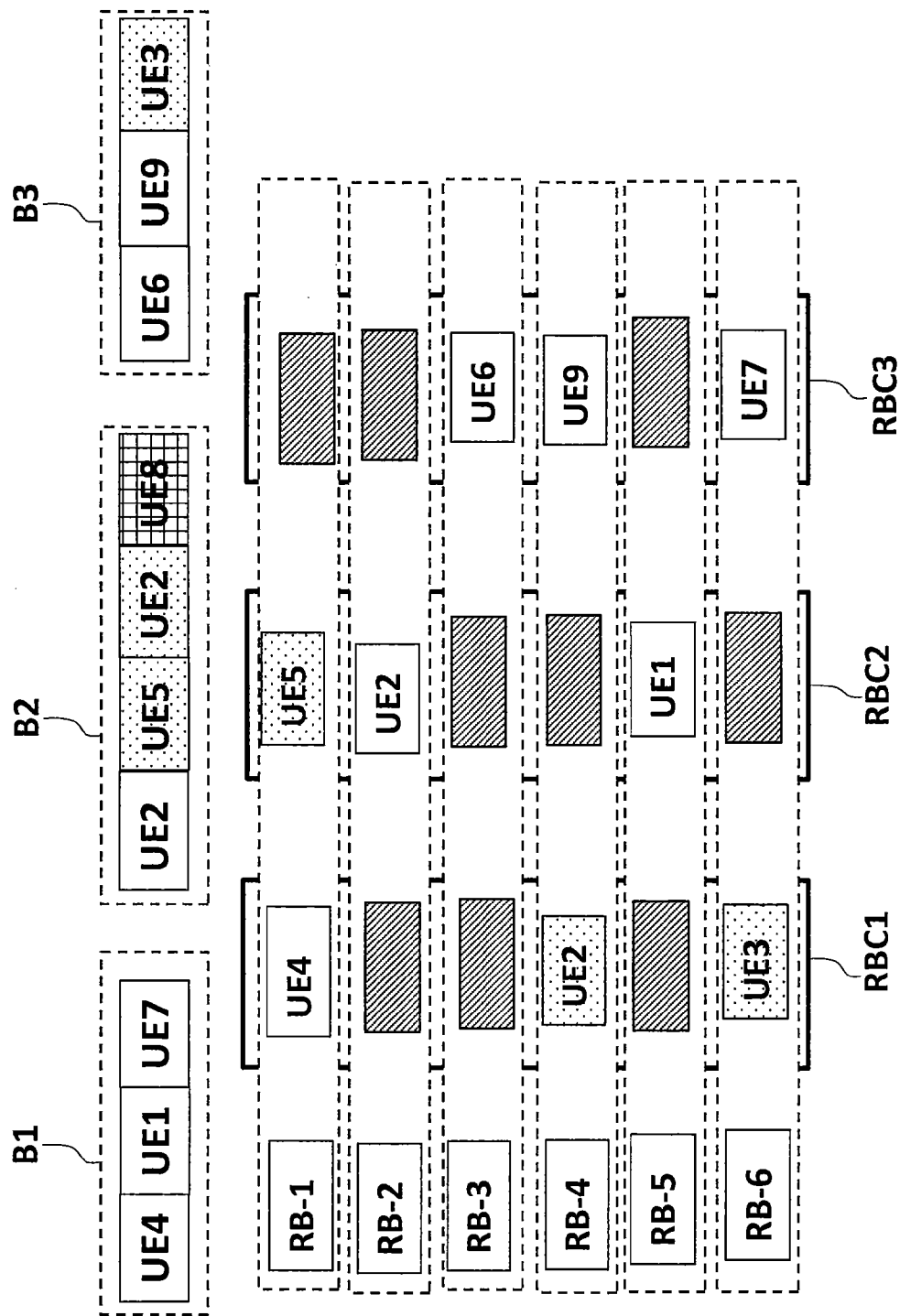
FIG. 15 is a schematic diagram of another example of how resources are allocated in a wireless communication system.

FIG. 15 illustrates another example of how RBs may be allocated to different UEs according to the RLC buffers of the cells. In the figure, traffic load is heavy and the number of available RBs in the centralized cluster pool of RBs is less than the number of buffered packets for transmission to UEs in the cluster. As illustrated at the top of the figure, there are packets for transmission to UE4, UE1, UE7 respectively in RLC sub-layer buffer B1, packets for transmission to UE2, UE5, UE2 and UE8 respectively in RLC sub-layer buffer B2, and packets for transmission to UE6, UE9 and UE3 respectively in RLC sub-layer buffer B3.

In FIG. 15, the cluster level scheduler (or cluster packet scheduler) 22 allocates RB-1 to UE4, RB-2 to a first packet of UE2, RB-3 to UE6, RB-4 to UE9, RB-5 to UE1, and RB-6 to UE7.

In this example, since the number of available RBs is more than the number of buffered packets for transmission to UEs in the cluster, the cluster level scheduler (or cluster packet scheduler) 22 further performs a selection of CoMP-CS cell(s). As illustrated in FIG. 15, RBs are not initially allocated to packets for transmission to UE5, UE2, UE8 in RLC sub-layer buffer B2 and packets for transmission to UE3 in RLC sub-layer buffer B3. After applying the above mentioned CoMP CS Algorithm, the cluster level scheduler (or cluster packet scheduler) 22 allocates RB-1 to the packet for transmission to UE5, RB-4 to the second packet for transmission to UE2, RB-6 to the packet for transmission to UE6; only the packet for transmission to UE8 (with checked pattern) is not allocated a RB for the present TTI, and the packets to be transmitted to UE5, UE2 and UE3 (with dotted pattern) are scheduled for CoMP-CS transmissions. Thus, inter-cell interference in the cluster is minimized by centralizing the coordination of downlink transmissions by using resource allocation or packet scheduling at the cluster level scheduler (or cluster packet scheduler) 22. Additionally, it is noted that utilization efficiency of available RBs in the cluster is enhanced by using a CoMP CS transmission scheme.

In FIG. 14, packets for transmission to UEs are scheduled in different RBs and there is neither a set of co-channel cells nor a set of co-channel UEs. In FIG. 15, there is a set of co-channel cells C1 and C2 and a set of co-channel UEs UE4 and UE5 at RB RB-1, a set of co-channel cells C1 and C3 and a set of co-channel UEs UE2 and UE9 at RB RB-4, and a set of co-channel cells C1 and C3 and a set of co-channel UEs UE3 and UE7 at RB RB-6.

Figure 16:
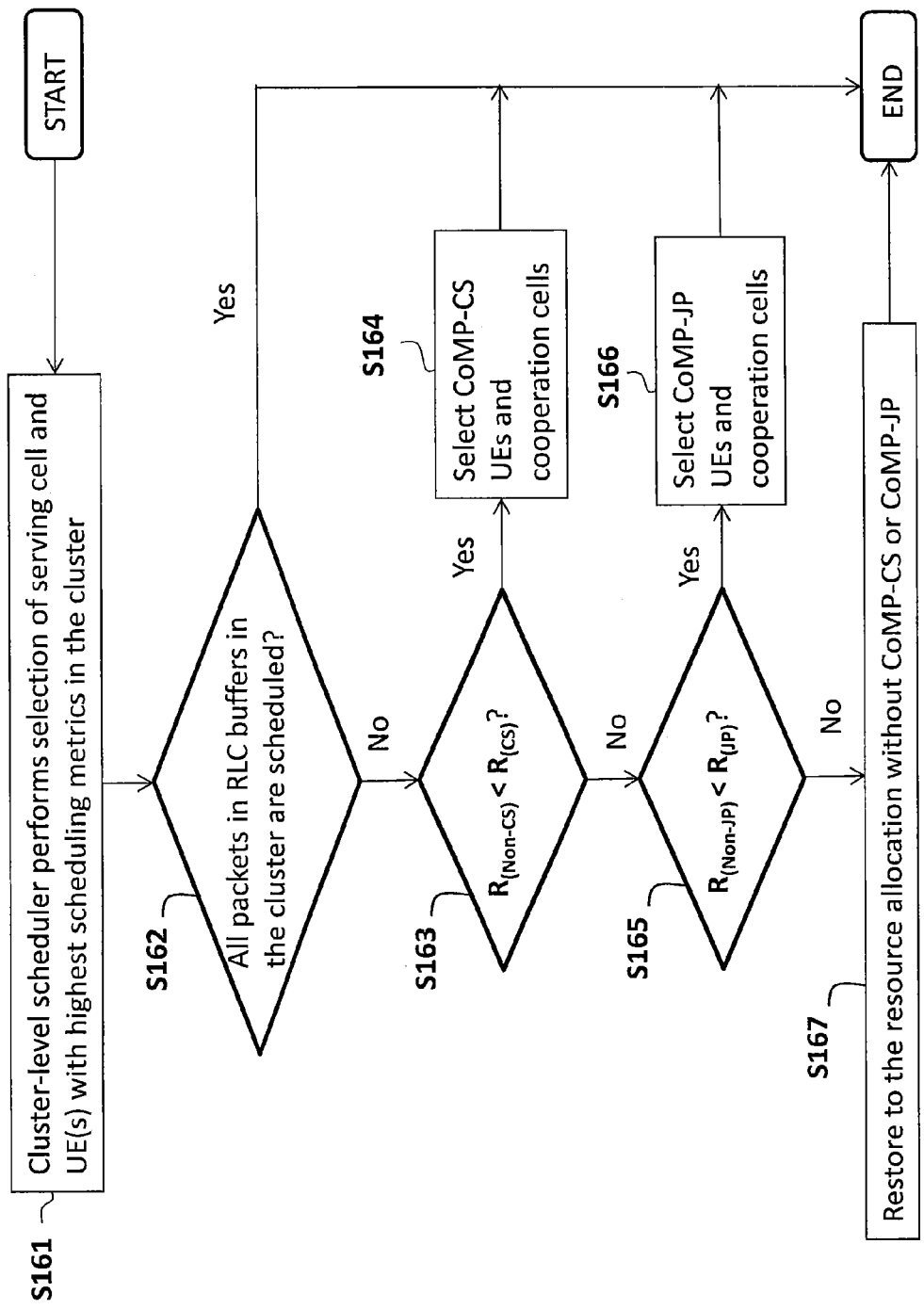
FIG. 16 is a flow diagram of an example of another embodiment of a method for coordinating one or more downlink transmissions.

FIG. 16 is a flow diagram of an example of another embodiment of a method for coordinating one or more downlink transmissions. In this example, most of the steps of the method (that is, steps S161 to S167) are performed periodically (such every TTI or every fixed number of TTIs).

At step S161, the cluster level scheduler (or cluster packet scheduler) 22 performs a selection of a serving cell and UE(s) with the highest scheduling metric(s) in the cluster of cells. Firstly, the cluster level scheduler (or cluster packet scheduler) 22 receives a buffer status of the packets for transmission in each cell from a corresponding BBU, calculates scheduling metrics of the UEs in the cluster of cells, and then selects the cell (within the cluster) and the UE (or UEs, if multi-user MIMO is applied) with the highest priority (or highest scheduling metric like maximum throughput or proportional fair) at the kth RB (or the RB "k"), the selected UE being served by the selected cell. The cluster level scheduler (or cluster packet scheduler) 22 then repeats this selection of a serving cell and UE(s) with the highest scheduling metric in the cluster of cells, until all available RBs are scheduled or until all of the downlink data packets for transmission to the UEs in the cluster is scheduled for transmission. As mentioned above, the cluster level scheduler (or cluster packet scheduler) 22 may determine aggregate scheduling metrics or system sum rates (that is, R(non-CS)) at step S161.

Put another way, within a pre-configured Transmission Time Interval (TTI), the cluster level scheduler (or cluster packet scheduler) 22 calculates scheduling metrics of the UEs in the cluster of cells (which as indicated above may comprise at least two cells corresponding to BBUs connected to the cluster level scheduler (or cluster packet scheduler) 22), and allocates a single pool of available RBs to at least one selected UE, so as to perform a first cluster-level resource allocation within the present TTI.

At step S161, the highest scheduling metrics are determined based on the channel quality metrics (such as CQI and RSRPs) reported by the UEs in the cluster, and any QoS requirement of the UEs. As indicated above, the selection of UE(s) may alternatively be determined based on packet scheduling algorithms such as PF, M-LWDF, etc. For example, the cluster level scheduler (or cluster packet scheduler) 22 may calculate the scheduling metrics of UEs in the cluster according to the amount of packet data to be transmitted to UEs queued at their respective BBUs and average waiting times, according to a PF algorithm. As indicated above, the channel quality metrics may comprise RSRQs, and each RSRQ may be expressed as:

$$RSRQ = \frac{N \times RSRP}{RSSI}$$

where N is the number of RBs in an Evolved Universal Terrestrial Radio Access (E-UIRA) carrier RSSI measurement bandwidth (that is, the number of RBs over a measurement bandwidth) and Received Signal Strength Indicator (RSSI) represents a power including power from co-channel serving cell and non-serving cells, adjacent channel interference, thermal noise etc.

At step S162, after the selection of a serving cell and UE(s) with the highest scheduling metrics in the cluster of cells, the cluster level scheduler (or cluster packet scheduler) 22 determines whether or not all packets in the RLC sub-layer buffer of each cell of the cluster are scheduled. If so, the present process ends. If not, at step S163, the cluster level scheduler (or cluster packet scheduler) 22 determines whether or not to select a CoMP-CS transmission scheme or a non-coherent CoMP-JP transmission scheme.

At step S163, the cluster level scheduler (or cluster packet scheduler) 22 follows the above mentioned CoMP-CS Algorithm to determine an aggregate scheduling metric or system sum rate $R_{(CS)}$. Then, the cluster level scheduler (or cluster packet scheduler) 22 determines whether $R_{(non-CS)}$ is less than $R_{(CS)}$ (that is, $R_{(non-CS)} < R_{(CS)}$).

Put another way, the cluster level scheduler (or cluster packet scheduler) 22 first calculates an aggregate scheduling metric for the CoMP-CS transmission scheme for the present RB, and compares the aggregate scheduling metric $R_{(CS)}$ for the CoMP-CS transmission scheme with a corresponding scheduling metric $R_{(non-CS)}$, in order to determine whether the aggregate scheduling metric for the CoMP-CS transmission scheme is greater than the corresponding scheduling metric for the present RB.

If so, the cluster level scheduler (or cluster packet scheduler) 22 selects CoMP-CS cooperating cells and CoMP-CS UEs and allocates the present RB to the CoMP-CS UEs at step S164.

If not, the cluster level scheduler (or cluster packet scheduler) 22 calculates an aggregate scheduling metric $R_{(JP)}$ for the non-coherent CoMP-JP transmission scheme for the present RB, and then compares the aggregate scheduling metric $R_{(JP)}$ for the non-coherent CoMP-JP transmission scheme with a corresponding scheduling metric which may be either $R_{(non-JP)}$ or $R_{(non-CS)}$ for the present RB. It is envisaged that the cluster level scheduler (or cluster packet scheduler) 22 may alternatively compare the aggregate scheduling metric $R_{(JP)}$ for the non-coherent CoMP-JP transmission scheme with the aggregate scheduling metric $R_{(CS)}$ for the CoMP-CS transmission scheme in another example (in particular, in another example where $R_{(CS)}$ is substantially equal to $R_{(non-CS)}$).

At step S165, the cluster level scheduler (or cluster packet scheduler) 22 follows the above mentioned CoMP-JP Algorithm to determine an aggregate scheduling metric or system sum rate $R_{(JP)}$. Then, the cluster level scheduler (or cluster packet scheduler) 22 determines whether $R_{(non-JP)}$ is less than $R_{(JP)}$) (that is, whether $R_{(non-JP)} < R_{(JP)}$).

At step S166, the cluster level scheduler (or cluster packet scheduler) 22 selects UEs and the cooperating cells for CoMP-JP transmission scheme (or interference coordination scheme).

The following table illustrates an example of the coordination of downlink transmissions performed by the cluster level scheduler (or cluster packet scheduler) 22 in this example:

| RB # | Packet Scheduling/Resource Allocation at step S161-S162 | Packet Scheduling/Resource Allocation at step S163-S164 | Non-Coherent CoMP-JP Transmission Points selected at step S165-S166 |
|---|---|---|---|
| RB-1 | UE4 | UE5 | N/A |
| RB-2 | UE2 | N/A | N/A |
| RB-3 | UE6 | N/A | N/A |
| RB-4 | UE9 | UE2 | C1, C2 |
| RB-5 | UE1 | N/A | N/A |
| RB-6 | UE7 | UE3 | C2, C3 |

That is, the cluster level scheduler (or cluster packet scheduler) 22 first allocates RB-1, RB-2, RB-3, RB-4, RB-5, RB-6 to the packets, which are buffered in BBUs and waiting to be transmitted to UE4, UE2, UE6, UE9, UE1, UE7 after performing steps S161 to S162. As indicated in the table above, these packets are allocated individual RB and thus results in minimal inter-cell interference. Then, the cluster level scheduler (or cluster packet scheduler) 22 performs steps S163 to S164 for each RB, and then determines that the packet for transmission to UE5 may be allocated to RB-1 (which is allocated with UE4 at step S161-S162), the packet for transmission to UE2 may be allocated to RB-4 (which is allocated with UE9 at step S161-S162), and the packet for transmission to UE3 can be allocated to RB-6 (which is allocated with UE7 at step S161-S162).

The cluster level scheduler (or cluster packet scheduler) then selects UEs and for CoMP-JP transmission scheme for RB-1, RB-4 and RB-6. The other RBs (such as RB-2, RB-3 and RB-5) are not allocated for CoMP-CS transmission in the present example.

Then, the cluster level scheduler (or cluster packet scheduler) 22 may continue to perform steps S165 to S166 for RBs RB-1, RB-4 and RB-6. In the present example, the cluster level scheduler (or cluster packet scheduler) 22 may only select non-coherent CoMP-JP transmission scheme for the RB-4 and RB-6. Then, the cluster level scheduler (or cluster packet scheduler) 22 selects cells C1, C2 as non-coherent CoMP-JP transmission points for RB-4 (the co-channel UEs are UE9 and UE2), and selects cells C2, C3 as non-coherent CoMP-JP transmission points for RB-6 (the co-channel UEs are UE7 and UE3).

In this example, if the cluster level scheduler (or cluster packet scheduler) 22 determines that the aggregate scheduling metric for the non-coherent CoMP-JP transmission scheme is greater than the corresponding scheduling metric in the first cluster-level resource allocation for the present RB, the cluster level scheduler (or cluster packet scheduler) 22 may revert back to the first cluster-level resource allocation.

At step S167, the cluster level scheduler (or cluster packet scheduler) 22 reverts back to the resource allocation/packet scheduling corresponding to the aggregate scheduling metric $R_{(non-CS)}$ if it is determined at step 165 that $R_{(non-JP)} > R_{(JP)}$.

After steps S164, S166, S167, the cluster level scheduler (or cluster packet scheduler) 22 configures the BBU corresponding to each cell of the cluster to allocate RBs transmission of packets to UEs in the cluster.

By performing packet scheduling or resource allocation as shown in one of more of the preceding examples, inter-cell interference may be minimized even when a CoMP-CS transmission scheme and/or a CoMP-JP transmission scheme is applied. For example, as CQIs are reported from UEs corresponding to BBUs in the cluster to the cluster level scheduler (or cluster packet scheduler) 22, CoMP-CS transmissions may be made, even if CQIs are not exchanged between different cells (for example, in the backhaul network of the LTE network). Also, in respect of a CoMP-CS transmission scheme, the above mentioned methods do not require beam-forming or feedback of channel direction information (CDI) from UEs within the cluster (such as those specified in the 3GPP Release 10 standard or the 3GPP LTE-Advanced standard). Also, as the BBUs 21 and the cluster level scheduler (or cluster packet scheduler) 22 may be located in the same physical location, there is minimal delay when reporting channel quality metrics (such as CQI and RSRPs) to the cluster level scheduler (or cluster packet scheduler) 22 which allows the cluster level scheduler (or cluster packet scheduler) 22 sufficient amount of time for determining whether or not one or more other transmission schemes (such as a non-coherent CoMP-JP transmission scheme) are to be applied.

Figure 17:
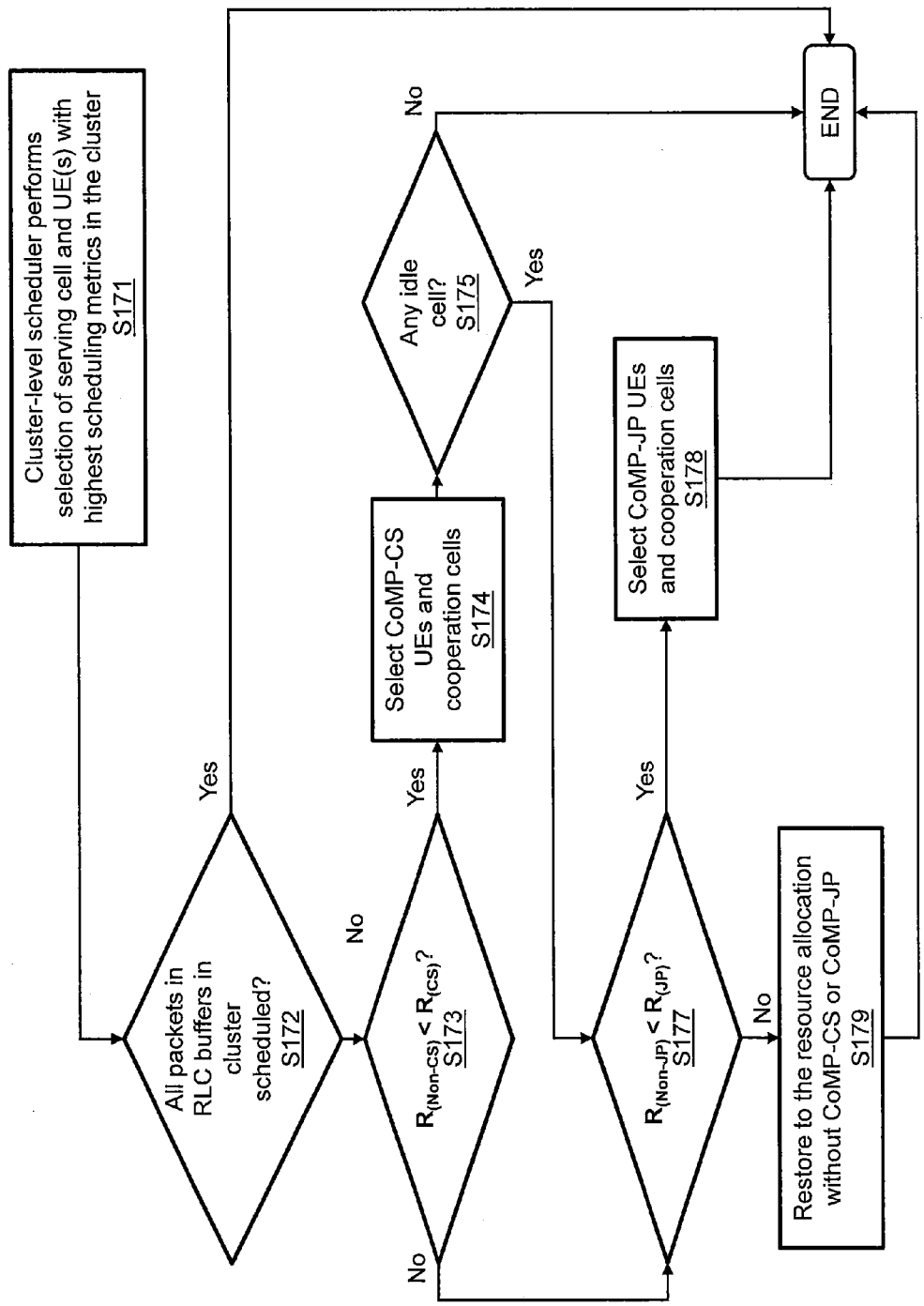
FIG. 17 is a flow diagram of an example of another embodiment of a method for coordinating one or more downlink transmissions.

FIG. 17 is a flow diagram of an example of another embodiment of a method for coordinating one or more downlink transmissions.

In this example, the cluster level scheduler (that is, the cluster packet scheduler 22 of the base station server 10) calculates scheduling metric(s) for a RB group (RBG) consisting of multiple (for example, 2, 4, 6 or 8) RBs at a TTI "t" for coordinating downlink transmissions for a next TTI "t+1". By considering a RBG consisting of multiple RBs instead of a single RB, resource allocation calculation time can be minimized.

At step S171, the cluster level scheduler (or cluster packet scheduler) 22 of the base station server 10 receives a CQI from each UE. It is envisaged that each CQI may be reported periodically or a-periodically. Also, it is envisaged that each reported CQI could be a sub-band CQI report or a wideband CQI report. In this step S171, the cluster level scheduler (or cluster packet scheduler) 22 stores the reported CQI values from each UE for subsequently calculating the scheduling metric(s) of each UE for each RBG. In this example, the CQI values are estimated measurements of reference signals from respective serving cells, and the CQI values are regarded as instantaneous values.

In addition, at step S171, the cluster level scheduler (or cluster packet scheduler) 22 also receive a set of RSRPs (or alternatively RSRQs in an alternative embodiment) from each UE. In this example, the RSRPs are reported from each UE periodically every 10 or 50 TTIs. In this example, the RSRPs are average values based on measurements of reference signals from serving cells and neighbouring cells, and the RSRPs fed back from each UE include a RSRP for a serving cell, and RSRPs for all neighbouring cells. It is envisaged that RSRPs may be more stable than CQIs (as RSRPs are determined over a longer period of time when compared to CQIs).

The CQI fed back from each UE is:

$$CQI = \frac{P_{serving\ cell}}{I+n}$$

In the equation above, CQI is expressed as a SINR value, $P_{serving\ cell}$ refers to an estimated measurement of a reference signal for a RBG, "n" refers to white noise, which can be estimated as a Gaussian random number, and I refers to interference from neighbouring cells. For example, for a CQI for a UE served by a cell C1, P1 is the power of a reference signal transmitted from the serving cell C1, I refers to the interference (which, in a 3-cell scenario, may be from another cell C2 or C3, or from the other two cells C2 and C3).

At step S171, the cluster level scheduler (or cluster packet scheduler) 22 calculates a CQI' that excludes the interference value I from the denominator. As the interference value I is variable, the value of I is estimated using:

$$I=RSRP+\alpha;$$

where RSRP is the power of a reference signal from a neighbouring cell measured by a UE, and $\alpha$ is a Gaussian random number.

In this example, the antennas of each base station client are omni-directional. It will be appreciated that in another example, the antennas of each base station client may be directional antennas, and the cluster of base station clients may consist of sectors from different cells rather than cluster of complete cells.

The cluster level scheduler (or cluster packet scheduler) 22 determines whether interference value I is from cell C2, from cell C3 or from both cells C2 and C3 based on the downlink transmissions previously coordinated by the cluster level scheduler (or cluster packet scheduler) 22 in the previous TTI. That is, the cluster level scheduler (or cluster packet scheduler) 22 checks the downlink transmissions previously coordinated by the cluster level scheduler (or cluster packet scheduler) 22 at the TTI "t−1" for the TTI "t".

For example, if the downlink transmissions previously coordinated by the cluster level scheduler (or cluster packet scheduler) 22 for a TTI "t" is based on a CoMP CS transmission mode where all of the cells C1, C2, C3 of a cluster transmit at a current kth RB (that is, at RB "k"), then when scheduling metrics are calculated for each UE in cell C1, the interference value is $I=I_2+I_3=(RSRP_2+\alpha_2)+(RSRP_3+\alpha_3)$.

In another example, if the downlink transmissions previously coordinated by the cluster level scheduler (or cluster packet scheduler) 22 for a TTI "t" is based on a CoMP CS transmission mode where just two of the three cells C1, C2 transmit at a current $k^{th}$ RB (that is, at RB "k"), then when scheduling metrics is calculated for each UE in cell C1, the interference value is $I=I_2=(RSRP_2+\alpha_2)$.

Since I can be estimated by using the equation $I=RSRP+\alpha$, CQI' can be determined by the cluster level scheduler (or cluster packet scheduler) 22 using the following equation:

$$CQI' = \frac{P_{serving\ cell}}{N}$$

In respect of the above equation, white noise "n" can be estimated according to measurement fed back from the UE so $P_{serving\ cell}$ can be determined for a UE. Thus, when the cluster level scheduler (or cluster packet scheduler) 22 estimates CQI' for a UE1 in cell C1, the cluster level scheduler (or cluster packet scheduler) 22 can estimate $cQI_{UE1}$, for the UE1 by approaches described previously. It is envisaged that the cluster level scheduler (or cluster packet scheduler) 22 may estimate CQI' for all UEs in the cluster according to the same approach. By using the estimated CQI' for UEs (with downlink packets buffered in RLC buffer) in the cluster, the cluster level scheduler (or cluster packet scheduler) 22 can calculate their corresponding scheduling metrics or simply sort the CQI' values of UEs and select the UE with greatest CQI' value for current RB or RBG using the following equation:

$$UE_{scheduled} = \arg\max(CQI'_{UEx})$$

Next, the cluster level scheduler (or cluster packet scheduler) 22 calculates aggregate scheduling metrics $CQI'_{non-CS}$ for resource allocation at current $k^{th}$ RB (that is, at RB "k").

The cluster level scheduler (or cluster packet scheduler) 22 then follows the previously described approach for all remaining RB or RBG until all downlink packets buffered in RLC buffer are all scheduled or scheduling metrics of all UEs had been calculated for RB or RBG. For example, if UE1 is scheduled for transmission at RB "k", RB "k+1", RB "k+2", and no more packets are to be transmitted m TTI "n+1", then in RB "k+3", the cluster level scheduler (or cluster packet scheduler) 22 excludes UE1 from the set of UE and only considers UE4, UE7.

For example, in FIG. 14, as white noise "n" can be estimated according to measurement fed back from UE, a P1 value can be estimated for UE1, P2 values can be respectively estimated for UE5, UE2 and UE8, and P3 values can be respectively estimated for UE6 and UE9.

Up to this stage, there is no consideration of a CoMP CS or CoMP JP transmission mode. As indicated above, the cluster level scheduler (or cluster packet scheduler) 22 may store data indicating which UE is scheduled for performing a downlink transmission at which RB for a current TTI "t".

Moving on to steps S172 to S175, if all buffered downlink packets are scheduled for transmission at TTI "n+1", there is no need to go through steps S173 to S175. Otherwise, if not all of the buffered downlink packets are scheduled, the cluster level scheduler (or cluster packet scheduler) 22 performs, for each RB or RBG, a CoMP CS estimation process where there is a downlink transmission to a UE in each one of a subset of the cluster of cells.

Figure 20:
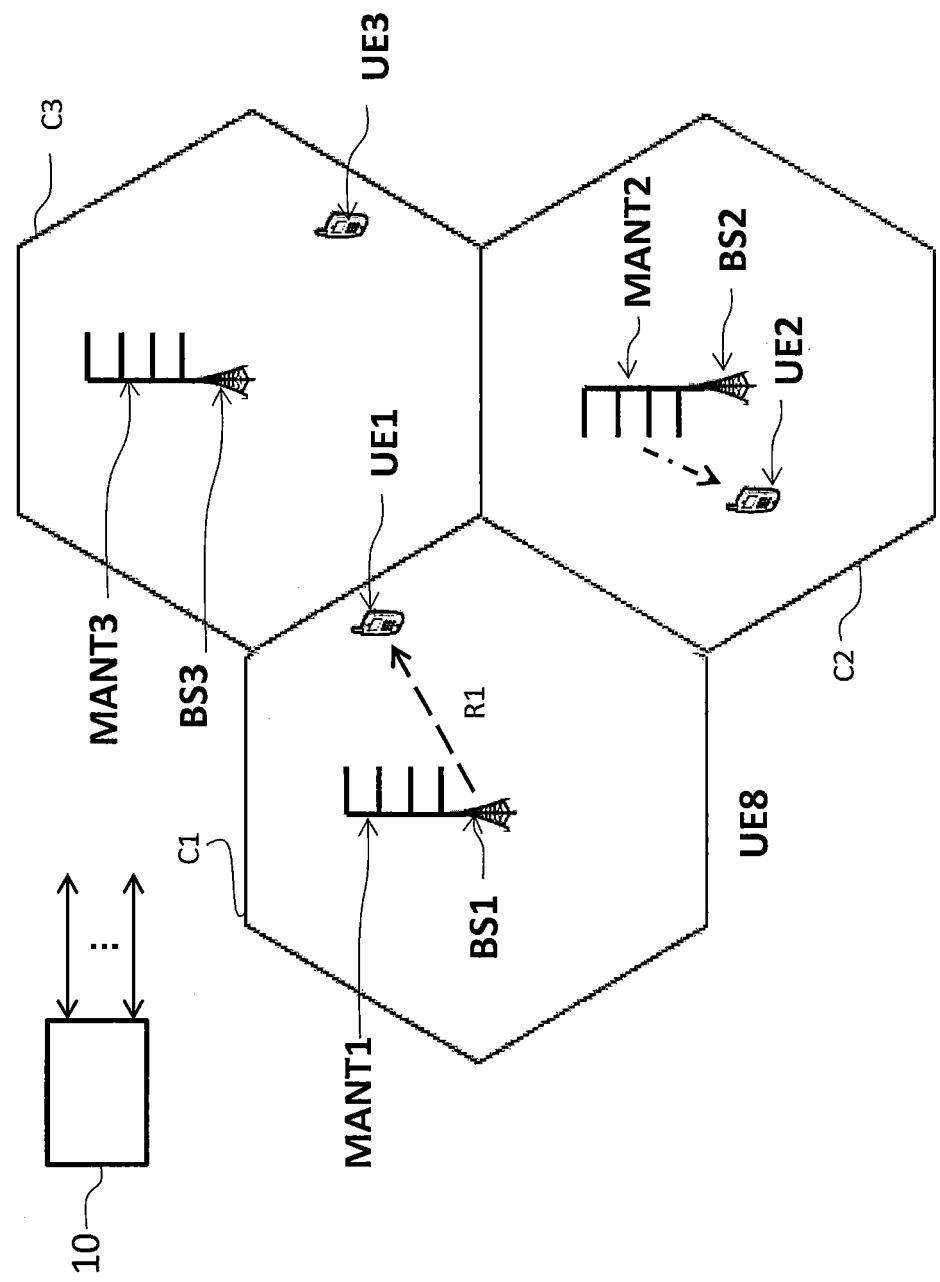
FIGS. 20 to 23 are schematic diagrams illustrating various scenarios involving a wireless communication system.

For example, in a scenario (referred herein as scenario (2-1)) comprising an example involving a 3-cell cluster illustrated in FIG. 20, after UE1 has been scheduled and all estimated values $P_1$, $P_2$, $I_1$, $I_2$, N have been acquired, UE2 attempts to be scheduled according to a CoMP CS transmission mode at RB "k" and thus there is a downlink transmission to a UE in each one of two of the cluster of cells. The aggregate scheduling metrics in RB "k" in this case is:

$$CQI_{CS-1} = \frac{P_1}{I_2 + N} + \frac{P_2}{I_1 + N}$$

Figure 21:
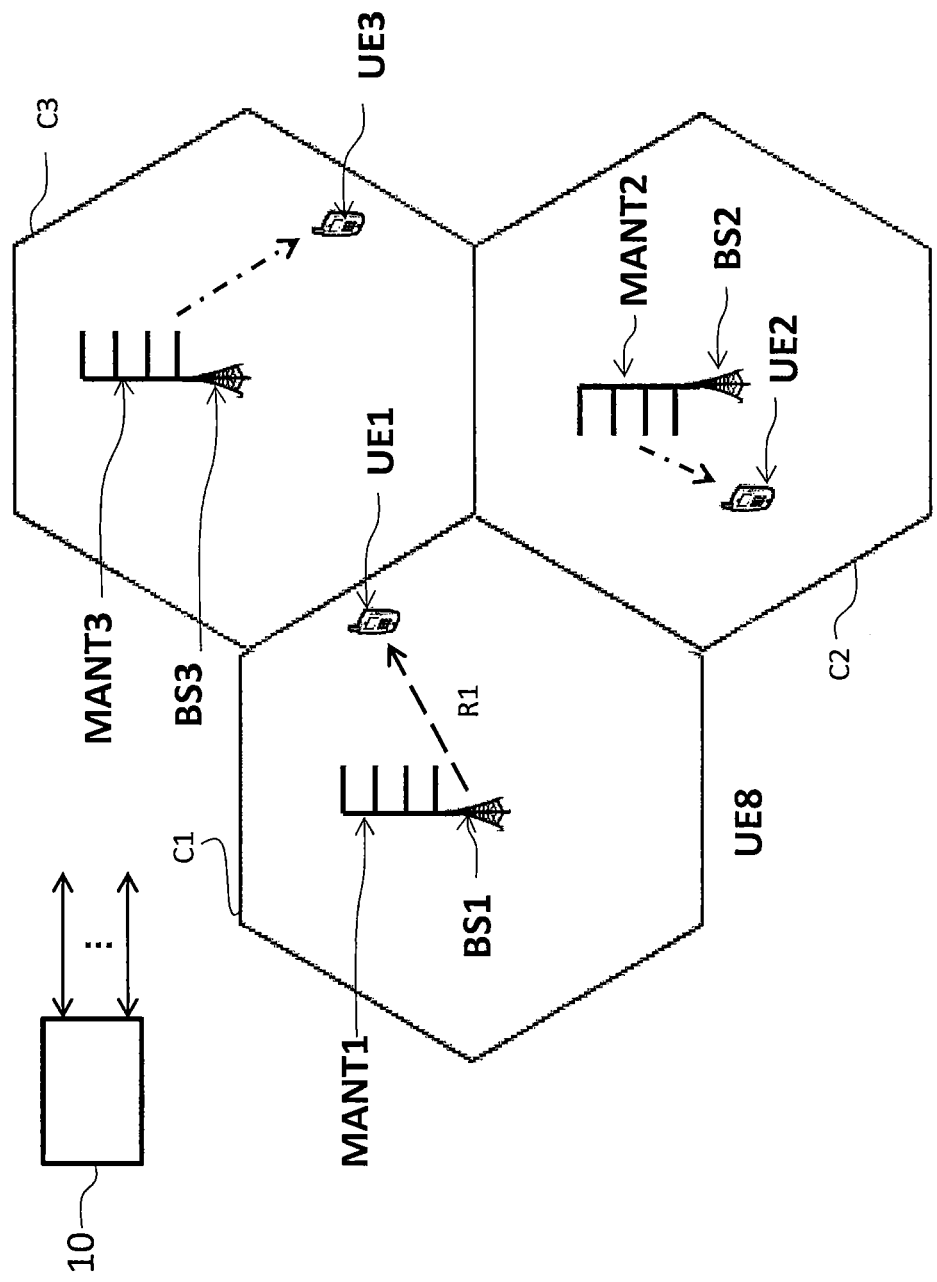

Next, in a scenario referred herein as scenario (2-2)) comprising an example involving a 3-cell cluster illustrated in FIG. 21, UE3 attempts to be scheduled according to a CoMP CS transmission mode at current RB "k" and thus there is a downlink transmission to a UE in each one of the cluster of cells. In this case, the cluster level scheduler (or cluster packet scheduler) 22 estimates aggregate scheduling metrics in RB "k" using:

$$CQI_{CS-2} = \frac{P_1}{I_2 + I_3 + N} + \frac{P_2}{I_1 + I_3 + N} + \frac{P_3}{I_1 + I_2 + N}$$

At step S173, the cluster level scheduler (or cluster packet scheduler) 22 then selects CoMP CS scenario with the greatest $CQI_{CS-x}$ value to be the $CQI_{CoMP-CS}$ value:

$$CQI_{CoMP-CS} = \arg\max(CQI_{CS-x})$$

Then, the cluster level scheduler (or cluster packet scheduler) 22 compares the $CQI_{CoMP-CS}$ value to the $CQI'_{non-CS}$ value previously acquired by the cluster level scheduler (or cluster packet scheduler) 22. When the $CQI_{CoMP-CS}$ value is greater than the $CQI'_{non-CS}$ value, the cluster level scheduler (or cluster packet scheduler) 22 selects the CoMP CS transmission mode for downlink transmissions in the next TTI.

In this respect, a person skilled in the art will appreciate that a CQI value can be directly converted to throughput (downlink transmission rate) by a mapping table specified in 3GPP LTE standard.

The cluster level scheduler (or cluster packet scheduler) 22 follows the previously described approach for all remaining RB or RBG until all downlink packets buffered in RLC buffer are all scheduled or scheduling metrics of UEs had been calculated for RB or RBG. However, if not all of the buffered downlink packets are scheduled, the cluster level scheduler (or cluster packet scheduler) 22 performs, for each RB or RBG, a CoMP JP estimation process where each one of a subset of the cluster of cells performs a downlink transmission to the same UE in steps S177 to S178.

Figure 22:
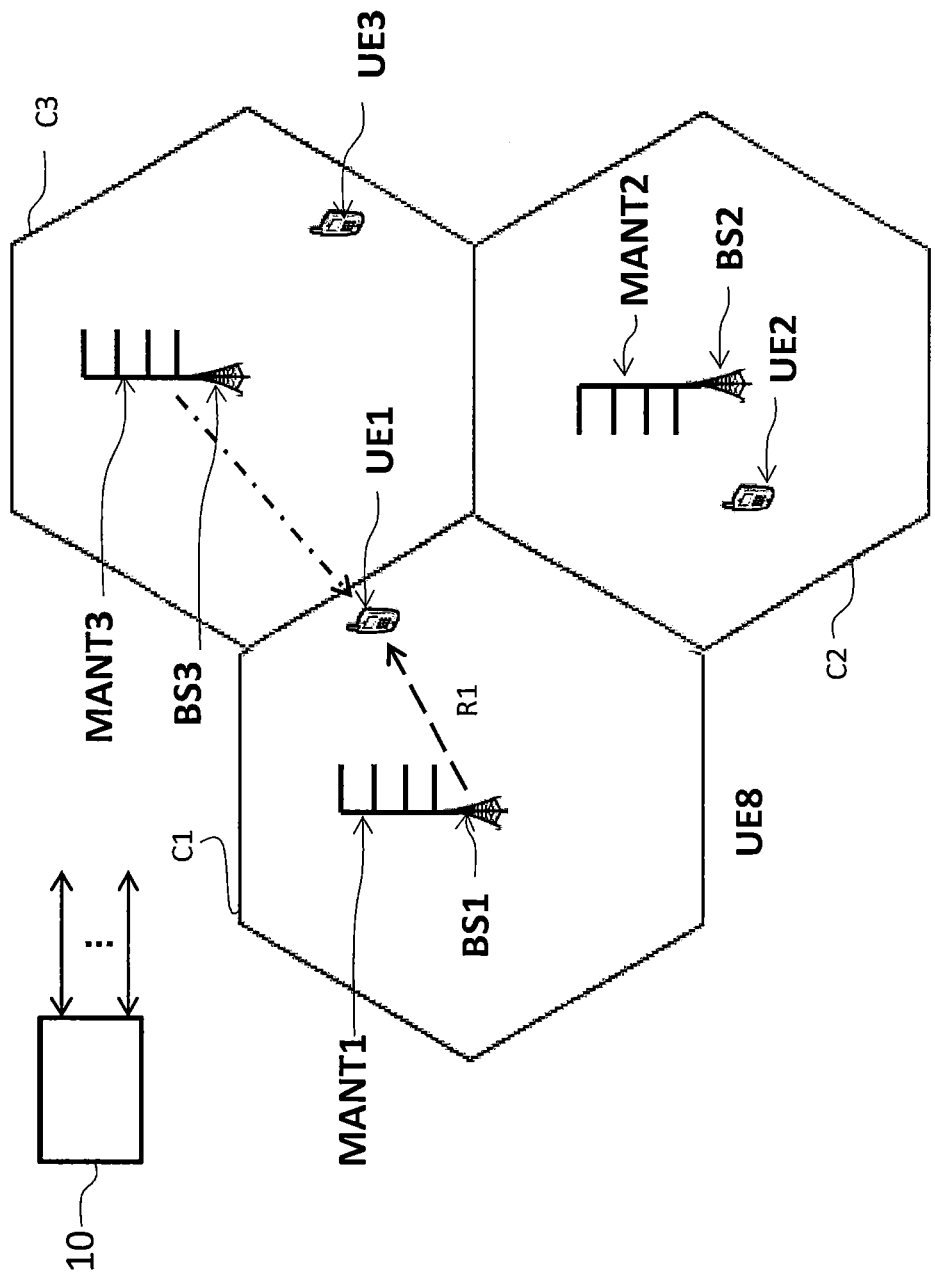

For example, in a scenario (referred herein as scenario (3-1)) comprising an example involving a 3-cell cluster illustrated in FIG. 22, the cluster level scheduler (or cluster packet scheduler) 22 selects the CoMP JP transmission mode in respect of cell C3 at RB "k", and the aggregate scheduling metrics in RB "k" is:

$$CQI_{JP-1} = \frac{P_1 + P_3}{N}$$

Finally, if not all of the buffered downlink packets are scheduled, the cluster level scheduler (or cluster packet scheduler) 22 performs, for each RB or RBG, a CoMP hybrid estimation process where each one of a first subset of the cluster of cells performs a downlink transmission to the same UE, and each one of a second subset of the cells 11*a*, 12*a*, 13*a* perform a downlink transmission to a respective one of a plurality of different UEs.

Figure 23:
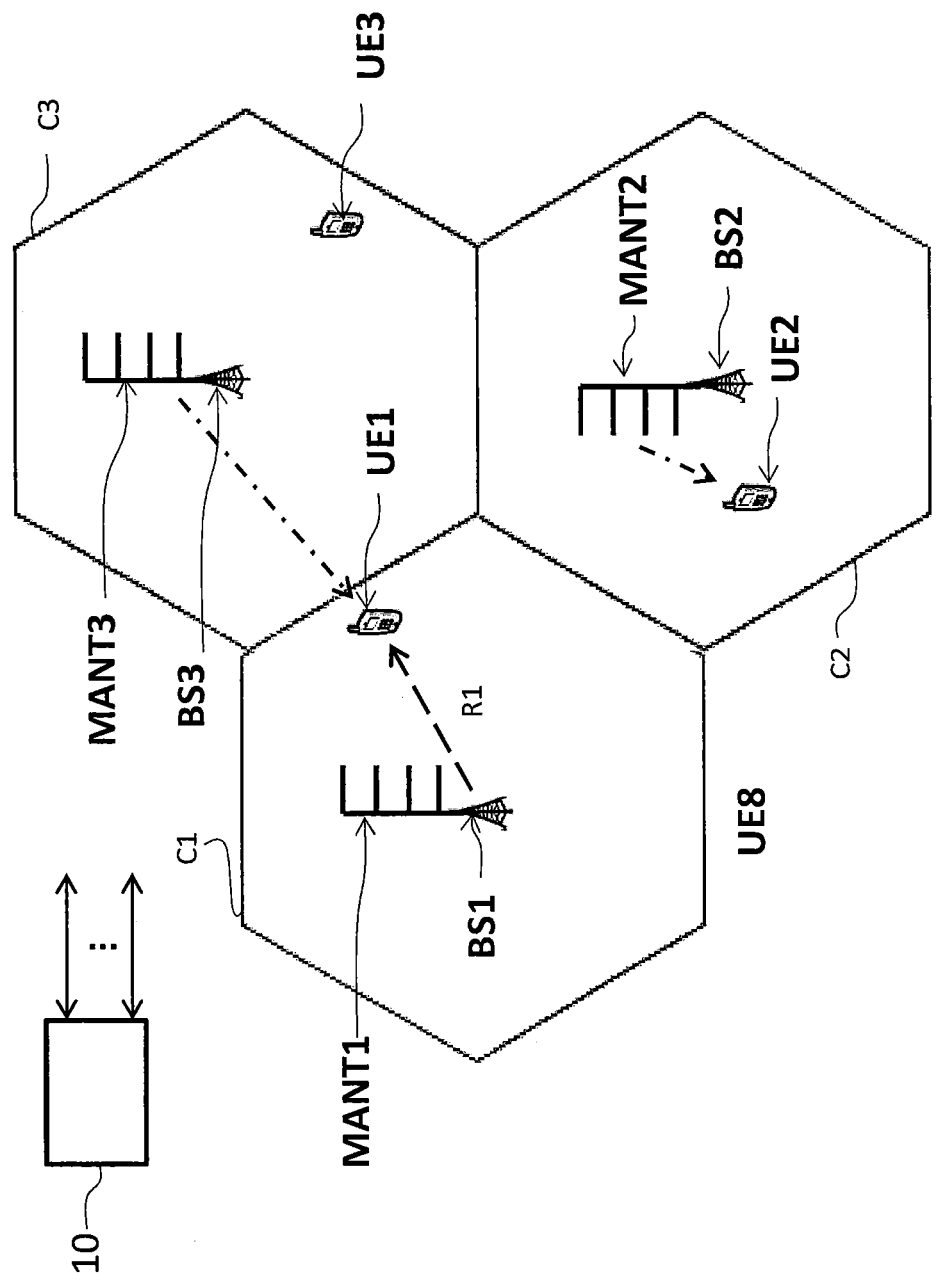

For example, in a scenario (referred herein as scenario (3-2)) comprising an example involving a 3-cell cluster illustrated in FIG. 23. In this example, UE1 has been scheduled and all estimated values P1, P2, I1, I2, N have been acquired. Also, the cluster level scheduler (or cluster packet scheduler) 22 has performed the above mentioned CoMP CS estimation process and CoMP JP estimation process. The cluster level scheduler (or cluster packet scheduler) 22 selects cell C3 for UE1, and the aggregate scheduling metrics in RB "k" is:

$$CQI_{JP-2} = \frac{P_1 + P_3}{P_2 + N} + \frac{P_2}{P_1 + P_3 + N}$$

It is envisaged that there may be alternative or additional scenarios to those mentioned above. For example, at step 177, after the cluster level scheduler (or cluster packet scheduler) 22 selects the greatest $CQI_{JP-x}$ value to be the $CQI_{CoMP-JP}$ value, the cluster level scheduler (or cluster packet scheduler) 22 may compare the $CQI_{CoMP-JP}$ value to a previously determined $CQI_{non-JP}$ value, a previously determined $CQI'_{non-CS}$ value or a previously determined $CQI_{CoMP-CS}$ value.

As noted above, a CQI value can be directly converted to downlink throughput (that is, a Sum Rate R). For example, by following above-mentioned step S171, the cluster level scheduler (or cluster packet scheduler) 22 may obtain an aggregate sum rate as $R_{CQInon-CS}$ (that is, an aggregate CQI value in respect of a transmission mode where only a single downlink transmission is performed by one of the cells).

Persons skilled in the art will appreciate that any of the methods described above could be embodied in program code. The program code could be supplied in a number of ways, for example on a tangible computer readable medium, such as a disc or a memory or as a data signal.

It is to be understood that any reference to prior art made herein does not constitute an admission that the prior art formed or forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for coordinating one or more downlink transmissions in a wireless communication system comprising a cluster of base station clients in communication with a base station cluster coordinator, the method comprising:
   receiving at the base station cluster coordinator from each one of the cluster of base station clients, a User Equipment (UE) parameter set for each UE served by the respective one of the cluster of base station clients;
   determining a plurality of cluster parameter sets in respect of respective ones of a plurality of transmission modes at the base station cluster coordinator, based on the UE parameter sets;
   evaluating the cluster parameter sets at the base station cluster coordinator, in order to select at least one of the transmission modes for the cluster of base station clients;
   generating at the base station cluster coordinator at least one output according to the at least one transmission mode; and
   transmitting each output to at least one of the base station clients to control the at least one base station client to perform the one or more downlink transmissions,
   wherein a first one of the plurality of transmission modes is a transmission mode where only one of the cluster of base station clients performs a downlink transmission,
   wherein a second one of the plurality of transmission modes is a Coordinated Multi-Point (CoMP) transmission mode where each one of a set of the cluster of base station clients performs a downlink transmission, and
   wherein the CoMP transmission mode is selected from the group consisting of: a CoMP Coordinated Scheduling (CS) transmission mode where each one of the set of base station clients performs a downlink transmission to a respective one of a plurality of different UEs; a CoMP Joint Processing (JP) transmission mode where each one of the set of base station clients performs a downlink transmission to the same UE; and a CoMP hybrid transmission mode where each one of a first set of the cluster of base station clients performs a downlink transmission to the same UE, and each one of a second set of the cluster of base station clients performs a downlink transmission to a respective one of a plurality of different UEs.

2. A method as claimed in claim 1, wherein each UE parameter set comprises (i) a Channel Quality Indicator (CQI) indicating a channel quality between a UE and a base station client serving the UE and (ii) a set of Reference Signal Receipt Powers (RSRPs), each RSRP indicating a receipt power of a reference signal sent to the UE from a respective one of the base station clients.

3. A method as claimed in claim 2, wherein each cluster parameter set comprises a cluster CQI, and determining the cluster parameter sets comprises determining, for each one of the transmission modes, a cluster CQI based on the CQIs and the sets of RSRPs.

4. A method as claimed in claim 3, wherein determining a cluster CQI comprises:
   calculating a plurality of estimated cluster CQIs based on the CQIs and the sets of RSRPs received at the base station cluster coordinator; and
   comparing the estimated cluster CQIs, in order to determine the largest one of the estimated cluster CQIs as the cluster CQI.

5. A method as claimed in in claim 3, wherein evaluating the cluster parameter sets comprises:
   comparing the cluster CQIs, in order to determine the largest one of the cluster CQIs; and
   selecting the transmission mode corresponding to the largest cluster CQI.

6. A method as claimed in claim 1, further comprising receiving each UE parameter set from a UE at one of the cluster of base station clients.

7. An apparatus for coordinating one or more downlink transmissions in a wireless communication system comprising a cluster of base station clients, the apparatus being in communication with each one of the cluster of base station clients and comprising:
   a User Equipment (UE) parameter set receiver arranged to receive from each one of the cluster of base station clients, a UE parameter set for each UE served by the respective one of the cluster of base station clients;
   a cluster parameter set determiner arranged to determine a plurality of cluster parameter sets in respect of respective ones of a plurality of transmission modes at the base station cluster coordinator, based on the UE parameter sets;
   a transmission mode selector arranged to evaluate the cluster parameter sets at the base station cluster coordinator, in order to select at least one of the transmission modes for the cluster of base station clients;
   an output generator arranged to generate at least one output according to the at least one transmission mode; and
   an output transmitter arranged to transmit each output to at least one of the base station clients to control the at least one base station client to perform the one or more downlink transmissions,
   wherein a first one of the plurality of transmission modes is a transmission mode where only one of the cluster of base station clients performs a downlink transmission,
   wherein a second one of the plurality of transmission modes is a Coordinated Multi-Point (CoMP) transmission mode where each one of a set of the cluster of base station clients performs a downlink transmission, and
   wherein the CoMP transmission mode is selected from the group consisting of: a CoMP Coordinated Scheduling (CS) transmission mode where each one of the set of base station clients performs a downlink transmission to a respective one of a plurality of different UEs; a CoMP Joint Processing (JP) transmission mode where each one of the set of base station clients performs a downlink transmission to the same UE; and a CoMP hybrid transmission mode where each one of a first set of the cluster of base station clients performs a downlink transmission to the same UE and each one of a second set of the cluster of base station clients performs a downlink transmission to a respective one of a plurality of different UEs.

8. An apparatus as claimed in claim 7, wherein each UE parameter set comprises (i) a Channel Quality Indicator (CQI) indicating a channel quality between a UE and a base station client serving the UE and (ii) a set of Reference Signal Receipt Powers (RSRPs), each RSRP indicating a receipt power of a reference signal sent to the UE from a respective one of the base station clients.

9. An apparatus as claimed in claim 8, wherein each cluster parameter set comprises a cluster CQI, and
wherein the cluster parameter set determiner is a cluster CQI determiner arranged to determine, for each one of the transmission modes, a cluster CQI based on the CQIs and the sets of RSRPs received at the UE parameter set receiver.

10. An apparatus as claimed in claim 9, wherein the cluster CQI determiner is arranged to:
calculate a plurality of estimated cluster CQIs based on the CQIs and the sets of RSRPs received at the UE parameter set receiver; and
compare the estimated cluster CQIs, in order to determine the largest one of the estimated cluster CQIs as the cluster CQI.

11. An apparatus as claimed in claim 9, wherein the transmission mode selector is arranged to:
compare the cluster CQIs determined at the cluster CQI determiner, in order to determine the largest one of the cluster CQIs; and select the transmission mode corresponding to the largest cluster CQI.

12. An apparatus as claimed in claim 7, wherein each base station client is arranged to receive a UE parameter set from a UE.

13. A wireless communication system comprising:
a cluster of base station clients, each one of the cluster of base station clients being arranged to receive a User Equipment (UE) parameter set from each UE served by the respective one of the cluster of base station clients; and
a base station cluster coordinator for coordinating one or more downlink transmissions in the wireless communication system, the apparatus being in communication with each one of the cluster of base station clients and comprising:
a UE parameter set receiver arranged to receive from each one of the cluster of base station clients, the UE parameter set for each UE served by the respective one of the cluster of base station clients;
a cluster parameter set determiner arranged to determine a plurality of cluster parameter sets in respect of respective ones of a plurality of transmission modes at the base station cluster coordinator, based on the UE parameter sets;
a transmission mode selector arranged to evaluate the cluster parameter sets at the base station cluster coordinator, in order to select at least one of the transmission modes for the cluster of base station clients;
an output generator arranged to generate at least one output according to the at least one transmission mode; and
an output transmitter arranged to transmit each output to at least one of the base station clients to control the at least one base station client to perform the one or more downlink transmissions,
wherein a first one of the plurality of transmission modes is a transmission mode where only one of the cluster of base station clients performs a downlink transmission,
wherein a second one of the plurality of transmission modes is a Coordinated Multi-Point (CoMP) transmission mode where each one of a set of the cluster of base station clients performs a downlink transmission and
wherein the CoMP transmission mode is selected from the group consisting of: a CoMP Coordinated Scheduling (CS) transmission mode where each one of the set of base station clients performs a downlink transmission to a respective one of a plurality of different UEs; a CoMP Joint Processing (JP) transmission mode where each one of the set of base station clients performs a downlink transmission to the same UE; and a CoMP hybrid transmission mode where each one of a first set of the cluster of base station clients performs a downlink transmission to the same UE, and each one of a second set of the cluster of base station clients performs a downlink transmission to a respective one of a plurality of different UEs.

* * * * *